(12) United States Patent
Anjo

(10) Patent No.: US 10,977,591 B2
(45) Date of Patent: Apr. 13, 2021

(54) WORK SHIFT MANAGEMENT DEVICE, WORK SHIFT MANAGEMENT METHOD AND COMPUTER-READABLE RECORDING MEDIUM

(71) Applicant: CASIO COMPUTER CO., LTD., Tokyo (JP)

(72) Inventor: Keita Anjo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1071 days.

(21) Appl. No.: 15/454,789

(22) Filed: Mar. 9, 2017

(65) Prior Publication Data

US 2017/0278044 A1   Sep. 28, 2017

(30) Foreign Application Priority Data

Mar. 23, 2016   (JP) .............................. JP2016-057943
Dec. 19, 2016   (JP) .............................. JP2016-245053

(51) Int. Cl.
*G06Q 10/06*   (2012.01)
*G06F 40/174*   (2020.01)
(Continued)

(52) U.S. Cl.
CPC .. G06Q 10/063116 (2013.01); *G06F 3/04847* (2013.01); *G06F 3/04886* (2013.01); *G06F 40/174* (2020.01); *G06F 40/177* (2020.01)

(58) Field of Classification Search
CPC ....... G06Q 10/06311; G06Q 10/06314; G06Q 10/063116; G06F 40/177; G06F 40/174; G06F 3/04847; G06F 3/04886
(Continued)

(56) References Cited

U.S. PATENT DOCUMENTS 6,587,831 B1 *   7/2003   O'Brien ........... G06Q 10/06311
                                                           705/7.16
9,679,265 B1 *   6/2017   Schwartz ......... G06Q 10/06311
(Continued)

FOREIGN PATENT DOCUMENTS

JP   2002041738 A   2/2002
JP   2007102470 A   4/2007
(Continued)

OTHER PUBLICATIONS

Love Jr. RR, Hoey JM. Management Science Improves Fast-Food Operations. Interfaces. 1990;20(2):21-29. doi:10.1287/inte.20.2.21.*

(Continued)

*Primary Examiner* — Eric W Stamber
*Assistant Examiner* — George H Walker, III
(74) *Attorney, Agent, or Firm* — Holtz, Holtz & Volek PC

(57) ABSTRACT

A work shift management device includes a first display controller and a counting unit. The first display controller displays, for each user ID, an input form for designating a desired working time slot among a plurality of working time slots. The counting unit counts a number of people who can work in each of the working time slots. The input form is a separate form corresponding to each of the working time slots, and is provided with a plurality of date fields having a predetermined form and being respectively associated with dates. A mark attachment area for attaching a predetermined mark is provided at each date field. The counting unit counts the number of people who can work in each of the time slots associated with each of the date fields by counting a number of the user IDs for which the mark is attached to the mark attachment area.

20 Claims, 20 Drawing Sheets

(51) Int. Cl.
*G06F 40/177* (2020.01)
*G06F 3/0484* (2013.01)
*G06F 3/0488* (2013.01)

(58) Field of Classification Search
USPC ........................................................ 705/7.16
See application file for complete search history.

(56) References Cited

U.S. PATENT DOCUMENTS

| | | | | |
|---|---|---|---|---|
| 10,535,024 | B1* | 1/2020 | Westland | G06Q 10/06311 |
| 10,572,844 | B1* | 2/2020 | Westland | G06F 3/0481 |
| 2007/0250370 | A1* | 10/2007 | Partridge | G06Q 10/1097 |
| | | | | 705/7.14 |
| 2013/0090968 | A1* | 4/2013 | Borza | G06Q 10/06 |
| | | | | 705/7.16 |
| 2013/0103442 | A1* | 4/2013 | Burks | G06Q 50/12 |
| | | | | 705/7.13 |
| 2015/0339620 | A1* | 11/2015 | Esposito | G06Q 10/1093 |
| | | | | 705/7.16 |
| 2016/0196524 | A1 | 7/2016 | Ito | |
| 2016/0342929 | A1* | 11/2016 | Tanaka | G06Q 10/06314 |

FOREIGN PATENT DOCUMENTS

| | | |
|---|---|---|
| JP | 2015225550 A | 12/2015 |
| WO | 2015019806 A1 | 2/2015 |

OTHER PUBLICATIONS

ScheduleBase—selected web pages dated Mar. 12, 2016 downloaded via archive.org on Apr. 26, 2020.*
7Shifts—selected web pages dated Mar. 2, 2016 downloaded via archive.org on Apr. 26, 2020.*
HotSchedules—selected web pages dated Feb. 20, 2016 downloaded via archive.org on Apr. 26, 2020.*
Japanese Office Action dated Oct. 23, 2019 (and English translation thereof) issued in Japanese Application No. 2016-245053.

* cited by examiner

FIG.4

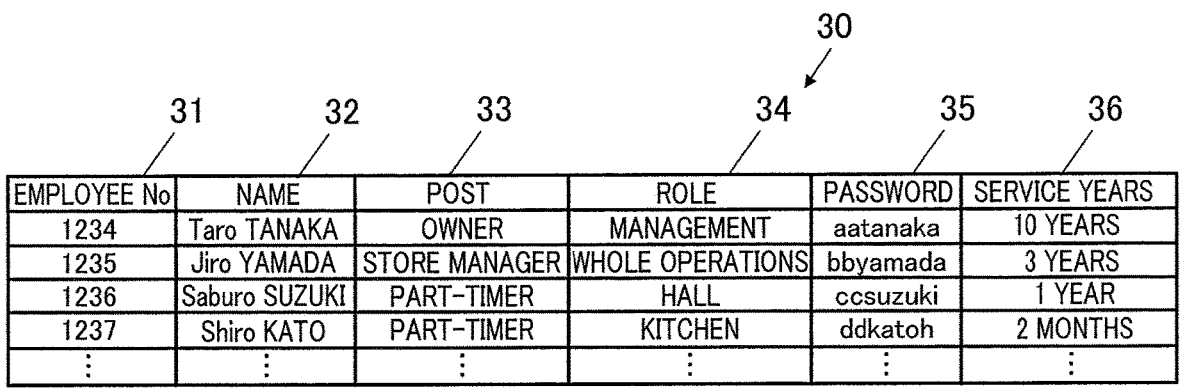

| EMPLOYEE No | NAME | POST | ROLE | PASSWORD | SERVICE YEARS |
|---|---|---|---|---|---|
| 1234 | Taro TANAKA | OWNER | MANAGEMENT | aatanaka | 10 YEARS |
| 1235 | Jiro YAMADA | STORE MANAGER | WHOLE OPERATIONS | bbyamada | 3 YEARS |
| 1236 | Saburo SUZUKI | PART-TIMER | HALL | ccsuzuki | 1 YEAR |
| 1237 | Shiro KATO | PART-TIMER | KITCHEN | ddkatoh | 2 MONTHS |
| ⋮ | ⋮ | ⋮ | ⋮ | ⋮ | ⋮ |

FIG.5

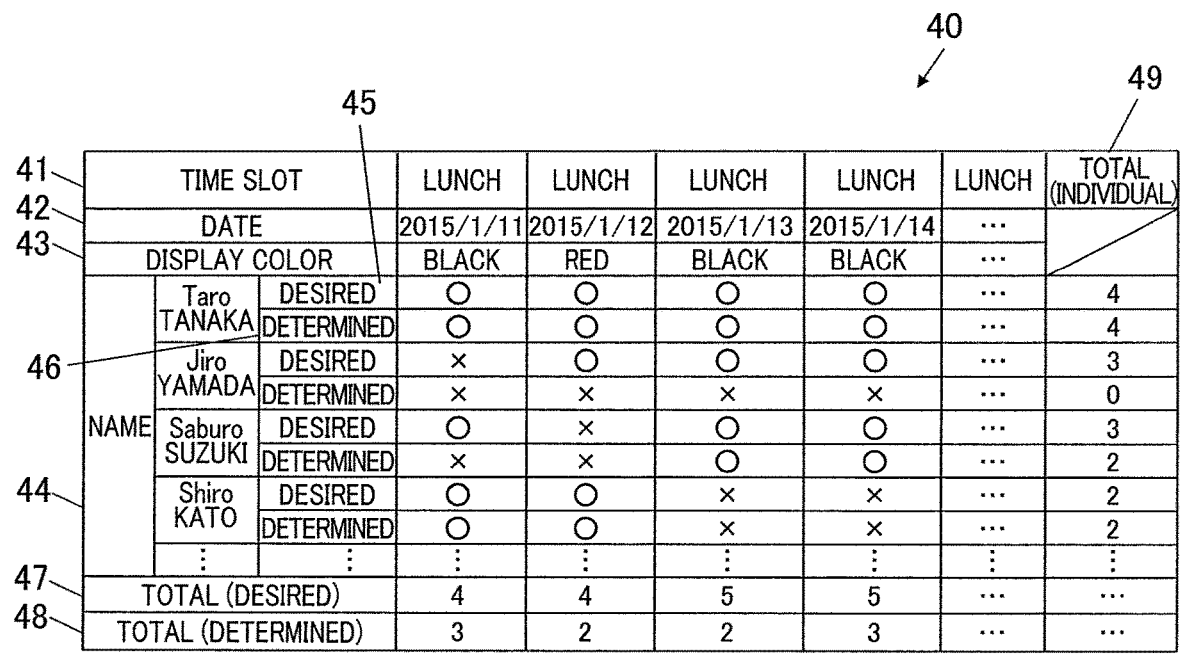

| TIME SLOT | | LUNCH | LUNCH | LUNCH | LUNCH | LUNCH | TOTAL (INDIVIDUAL) |
|---|---|---|---|---|---|---|---|
| DATE | | 2015/1/11 | 2015/1/12 | 2015/1/13 | 2015/1/14 | ⋯ | |
| DISPLAY COLOR | | BLACK | RED | BLACK | BLACK | ⋯ | |
| Taro TANAKA | DESIRED | ○ | ○ | ○ | ○ | ⋯ | 4 |
| | DETERMINED | ○ | ○ | ○ | ○ | ⋯ | 4 |
| Jiro YAMADA | DESIRED | × | ○ | ○ | ○ | ⋯ | 3 |
| | DETERMINED | × | × | × | × | ⋯ | 0 |
| Saburo SUZUKI | DESIRED | ○ | × | ○ | ○ | ⋯ | 3 |
| | DETERMINED | × | × | ○ | ○ | ⋯ | 2 |
| Shiro KATO | DESIRED | ○ | ○ | × | × | ⋯ | 2 |
| | DETERMINED | ○ | ○ | × | × | ⋯ | 2 |
| ⋮ | ⋮ | ⋮ | ⋮ | ⋮ | ⋮ | ⋮ | ⋮ |
| TOTAL (DESIRED) | | 4 | 4 | 5 | 5 | ⋯ | ⋯ |
| TOTAL (DETERMINED) | | 3 | 2 | 2 | 3 | ⋯ | ⋯ |

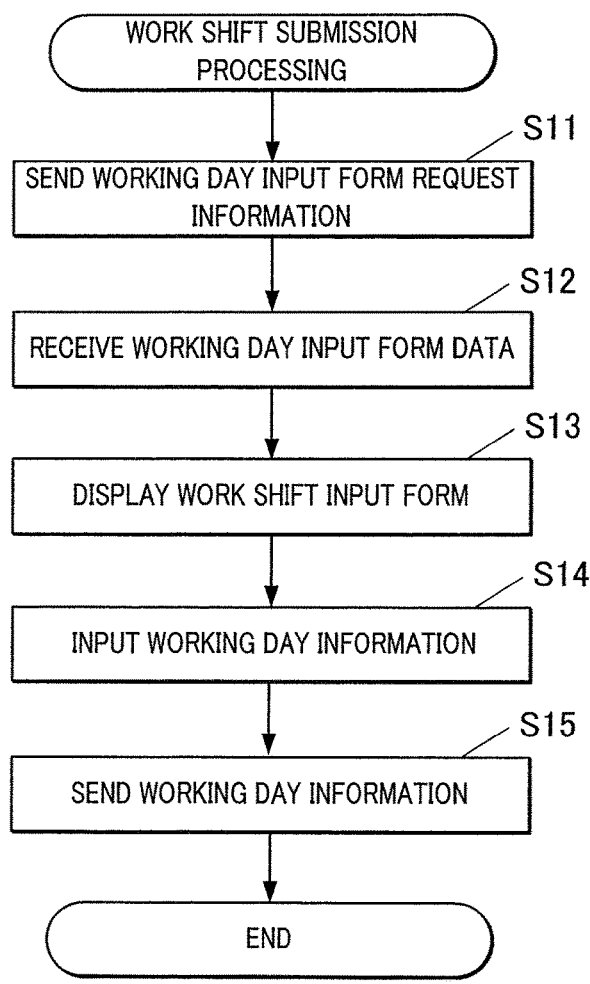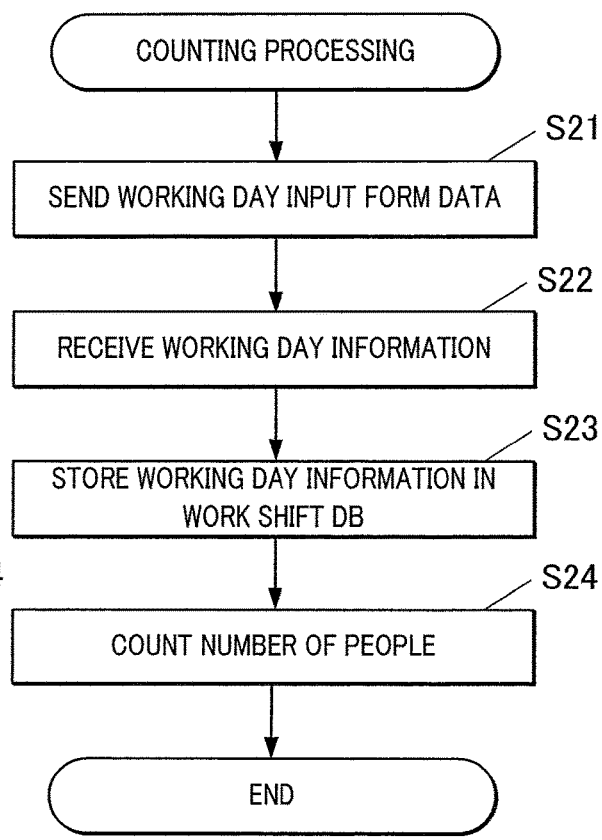

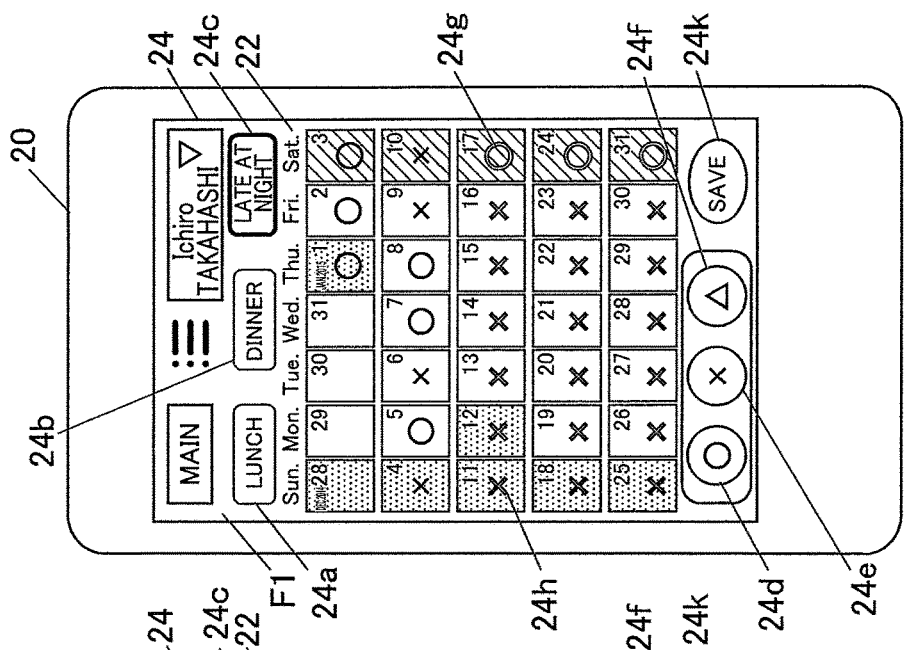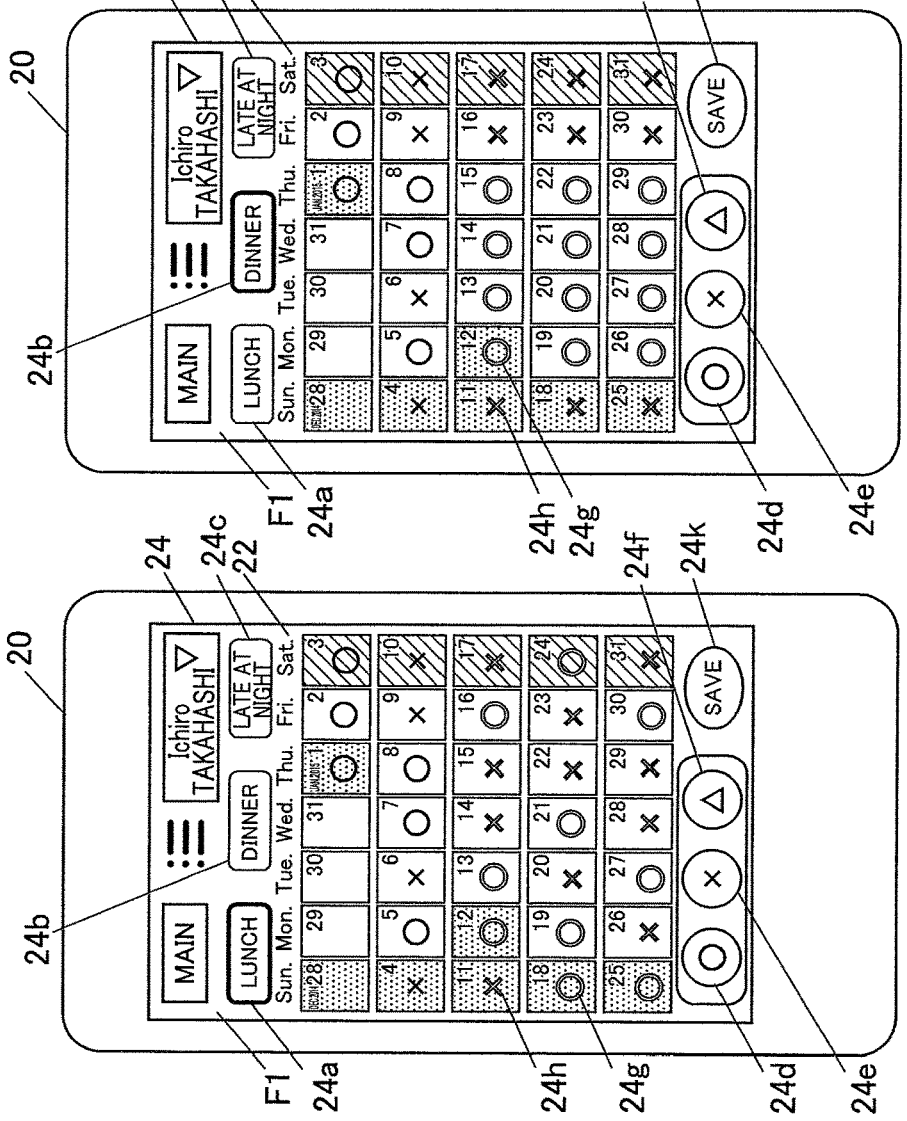

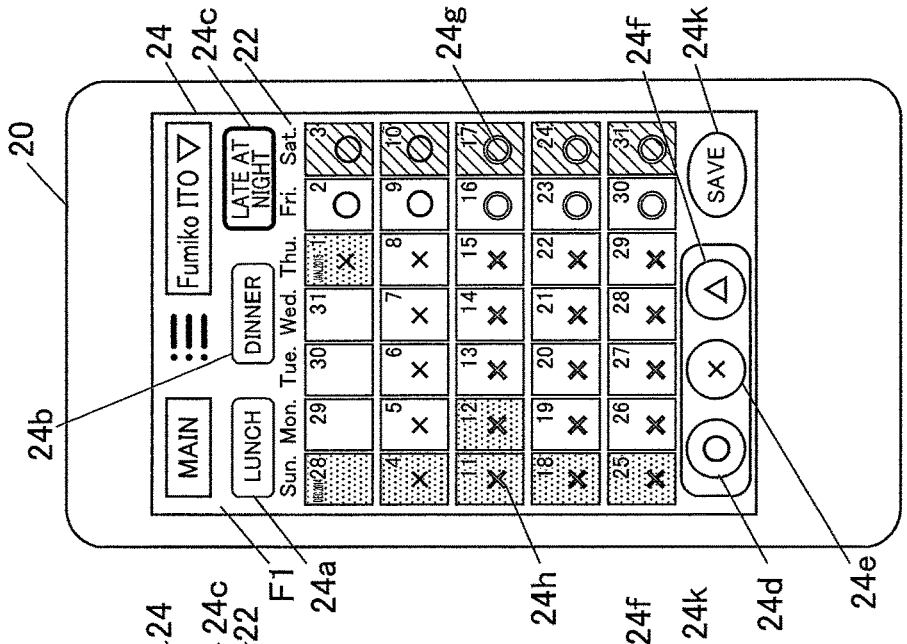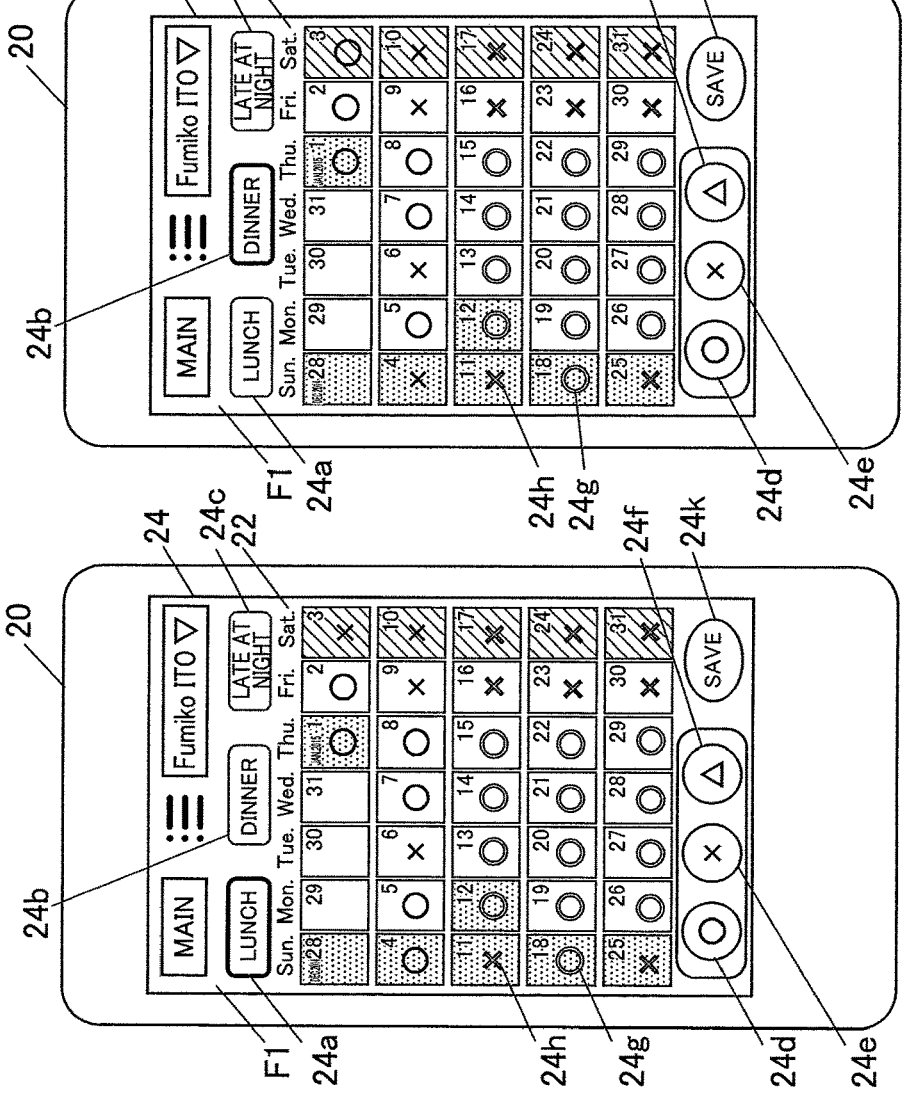

FIG.13A FIG.13B FIG.13C

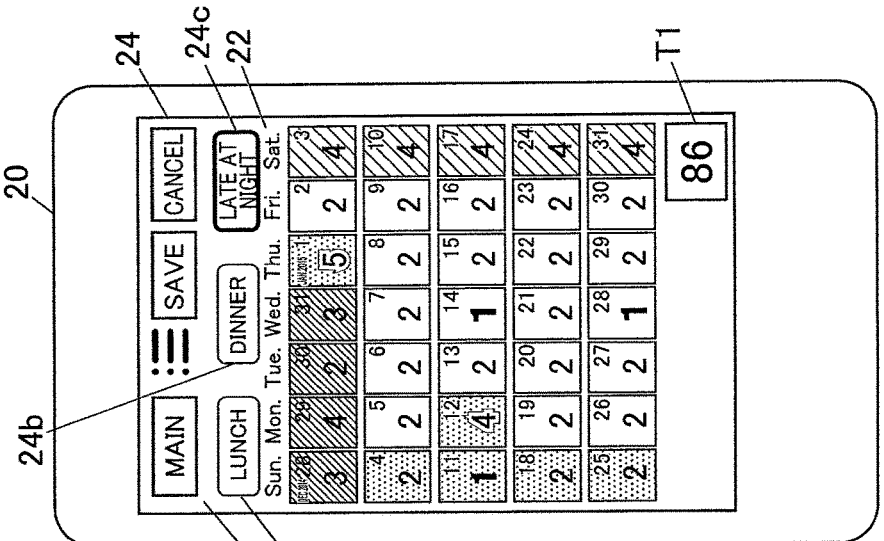
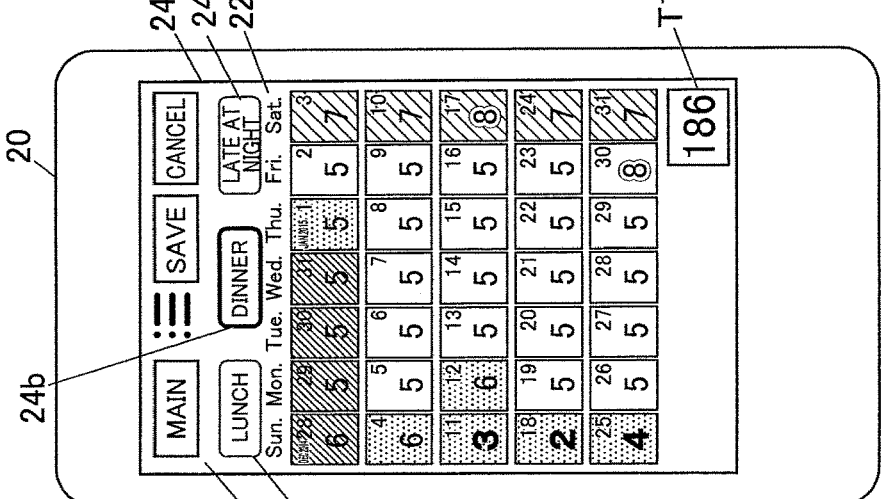
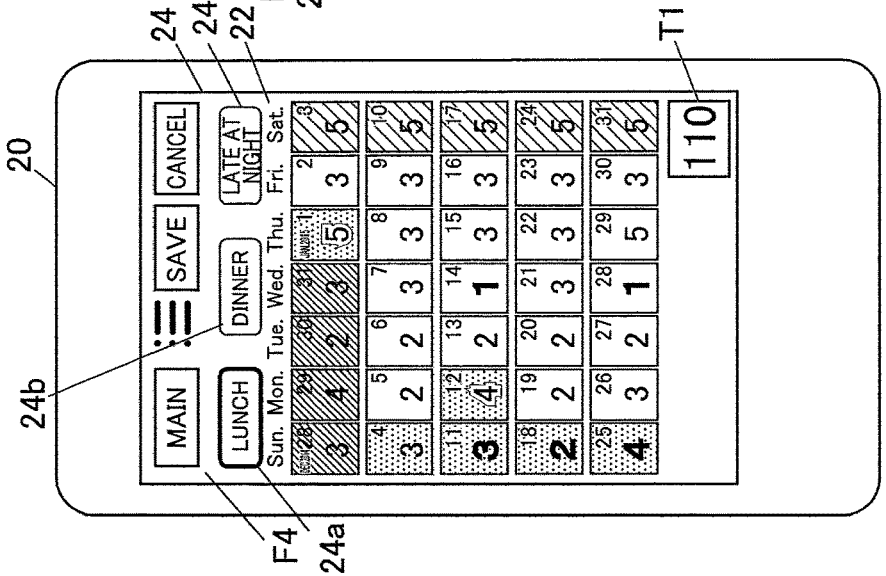

WORK SHIFT MANAGEMENT DEVICE, WORK SHIFT MANAGEMENT METHOD AND COMPUTER-READABLE RECORDING MEDIUM

CROSS-REFERENCE TO RELATED APPLICATIONS

This application is based upon and claims the benefit of priority from the prior Japanese Patent Application No. 2016-057943, filed on Mar. 23, 2016 and the prior Japanese Patent Application No. 2016-245053, filed on Dec. 19, 2016, the entire contents of which are incorporated herein by reference.

BACKGROUND OF THE INVENTION

1. Field of the Invention

The present invention relates to a work shift management device, a work shift management method and a computer-readable recording medium.

2. Description of the Related Art

Conventionally, for example, a work shift attendance system is known which includes terminals for employees which are owned by respective plural employees and which send desired work shift information including work shift attendance desired by the employees to a work shift allocation server, and the work shift allocation server which allocates work shift attendance schedule based on the desired work shift information sent from the terminals (refer to JP 2015-225550 A).

SUMMARY OF THE INVENTION

However, in the work shift attendance system described above, the attendance or absence for each of plural working time slots on each of desired working days needs to be designated at once, and thus, there is a problem that the operation for designation becomes complicated.

The present invention is made in consideration of such a problem. An object of the present invention is to make the input of desired work shift data simpler and to make the generation of work shift easier.

A work shift management device of the present invention includes: a first display controller which displays, for each user ID, an input form for designating a desired working time slot among a plurality of working time slots; and a counting unit which counts a number of people who can work in each of the working time slots, wherein the input form is a separate form corresponding to each of the working time slots, and is provided with a plurality of date fields having a predetermined form and being respectively associated with dates, a mark attachment area for attaching a predetermined mark is provided at each date field, and the counting unit counts the number of people who can work in each of the time slots associated with each of the date fields by counting a number of the user IDs for which the mark is attached to the mark attachment area.

A work shift management method of the present invention includes: a first display controlling step which displays, for each user ID, an input form for designating a desired working time slot among a plurality of working time slots; and a counting step which counts a number of people who can work in each of the working time slots, wherein the input form is a separate form corresponding to each of the working time slots, and is provided with a plurality of date fields having a predetermined form and being respectively associated with dates, a mark attachment area for attaching a predetermined mark is provided at each date field, and the counting step counts the number of people who can work in each of the time slots associated with each of the date fields by counting a number of the user IDs for which the mark is attached to the mark attachment area.

A non-transitory computer-readable recording medium storing a program thereon of the present invention, wherein the program makes a computer of a work shift management device perform processes, the processes include: a first display controlling process which displays, for each user ID, an input form for designating a desired working time slot among a plurality of working time slots; and a counting process which counts a number of people who can work in each of the working time slots, wherein the input form is a separate form corresponding to each of the working time slots, and is provided with a plurality of date fields having a predetermined form and being respectively associated with dates, a mark attachment area for attaching a predetermined mark is provided at each date field, and the counting process counts the number of people who can work in each of the time slots associated with each of the date fields by counting a number of the user IDs for which the mark is attached to the mark attachment area.

In accordance with the present invention, it is possible to make the input of desired work shift simpler and to make the generation of work shift easier.

BRIEF DESCRIPTION OF THE DRAWINGS

The present invention is fully understood from the detailed description given hereafter and the accompanying drawings, which are given by way of illustration only and thus are not intended to limit the present invention, wherein:

FIG. 4 is a view showing a configuration of an employee account DB;

FIG. 5 is a view showing a configuration of a work shift DB;

FIG. 6A is a flowchart showing work shift submission processing;

FIG. 6B is a flowchart showing counting processing;

FIG. 9A is a view showing an example of the display after Ichiro Takahashi inputs desired work shift to an input form of each of working time slots;

FIG. 9B is a view showing an example of the display after Ichiro Takahashi inputs desired work shift to the input form of each of working time slots;

FIG. 9C is a view showing an example of the display after Ichiro Takahashi inputs desired work shift to the input form of each of working time slots;

FIG. 10A is a view showing an example of the display after Fumiko Ito inputs desired work shift to the input form of each of working time slots;

FIG. 10B is a view showing an example of the display after Fumiko Ito inputs desired work shift to the input form of each of working time slots;

FIG. 10C is a view showing an example of the display after Fumiko Ito inputs desired work shift to the input form of each of working time slots;

FIG. 13A is a view showing an example of a determined work input form of each working time slot;

FIG. 13B is a view showing an example of the determined work input form of each working time slot;

FIG. 13C is a view showing an example of the determined work input form of each working time slot;

FIG. 18A is a view showing an example of screen display of the terminal device when the work shift confirmation processing is carried out;

FIG. 18B is a view showing an example of screen display of the terminal device when the work shift confirmation processing is carried out;

FIG. 18C is a view showing an example of screen display of the terminal device when the work shift confirmation processing is carried out;

FIG. 20A is a view showing an example of screen display of the terminal device when the work shift confirmation processing is carried out;

FIG. 20B is a view showing an example of screen display of the terminal device when the work shift confirmation processing is carried out;

FIG. 20C is a view showing an example of screen display of the terminal device when the work shift confirmation processing is carried out;

FIG. 21A is a view showing an example of screen display of the terminal device when the work shift confirmation processing is carried out;

FIG. 21B is a view showing an example of screen display of the terminal device when the work shift confirmation processing is carried out;

FIG. 21C is a view showing an example of screen display of the terminal device when the work shift confirmation processing is carried out;

DETAILED DESCRIPTION OF THE PREFERRED EMBODIMENTS

Hereinafter, embodiments of the present invention will be described with reference to the attached drawings. The scope of the invention is not limited to the illustrated examples.

Figure 1:
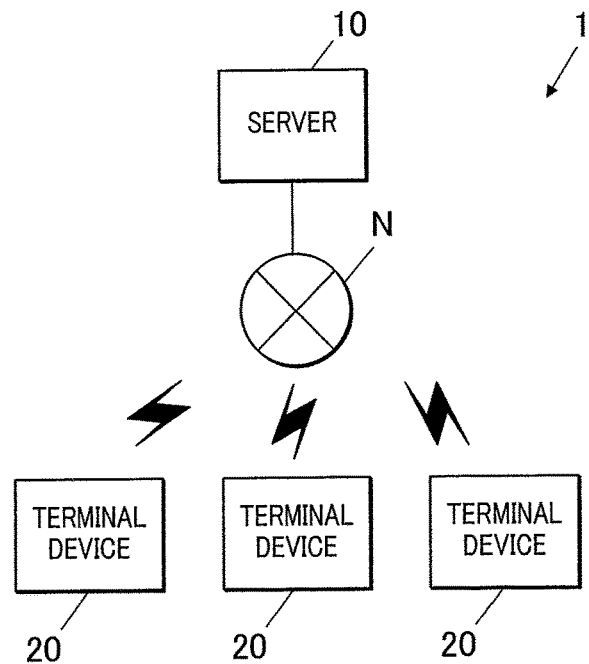
FIG. 1 is a block diagram showing a work shift management system of an embodiment of the present invention.

The configuration of a device of the present embodiment will be described with reference to FIGS. 1 to 3. A work shift management system 1 will be described with reference to FIG. 1. FIG. 1 is a block diagram showing the work shift management system 1.

The work shift management system 1 is a system which assists a manager such as a business manager of a retail shop, a restaurant or the like when he/she generates a work shift for managing working days of employees, for example.

The work shift management system 1 includes a server 10 as a work shift management device and a plurality of terminal devices 20. Each device of the work shift management system 1 is connected to a communication network N.

The server 10 is a server device in the cloud of the communication network N. The server 10 stores and manages the information on the work shift of employees. The server 10 is constituted by a single server. However, this is not limitative. The server 10 may be constituted by plural devices.

The terminal devices 20 are devices carried and used by a manager and employees as users. The terminal device 20 is a portable terminal such as a tablet PC, a note PC and a smartphone. The terminal device 20 can be wirelessly connected to the communication network N. Thus, employees can use the terminal devices 20 no matter when or where the employees are.

The communication network N is the Internet and may include WAN (Wide Area Network), LAN (Local Area Network), an exclusive line, or the like.

FIG. 1 illustrates three terminal devices 20 included in the work shift management system 1 as an example. However, the work shift management system 1 includes plural terminal devices 20 respectively owned by a manager and plural employees and is configured such that the server 10 manages the information of the manager and all the employees. Also, an application(s) which realizes the submission, generation, confirmation and the like of a work shift (hereinafter referred to as a work shift management application) is installed in each terminal device 20.

The functional configuration in the server 10 will be described with reference to FIG. 2. FIG. 2 is a block diagram showing the functional configuration of the server 10.

Figure 2:
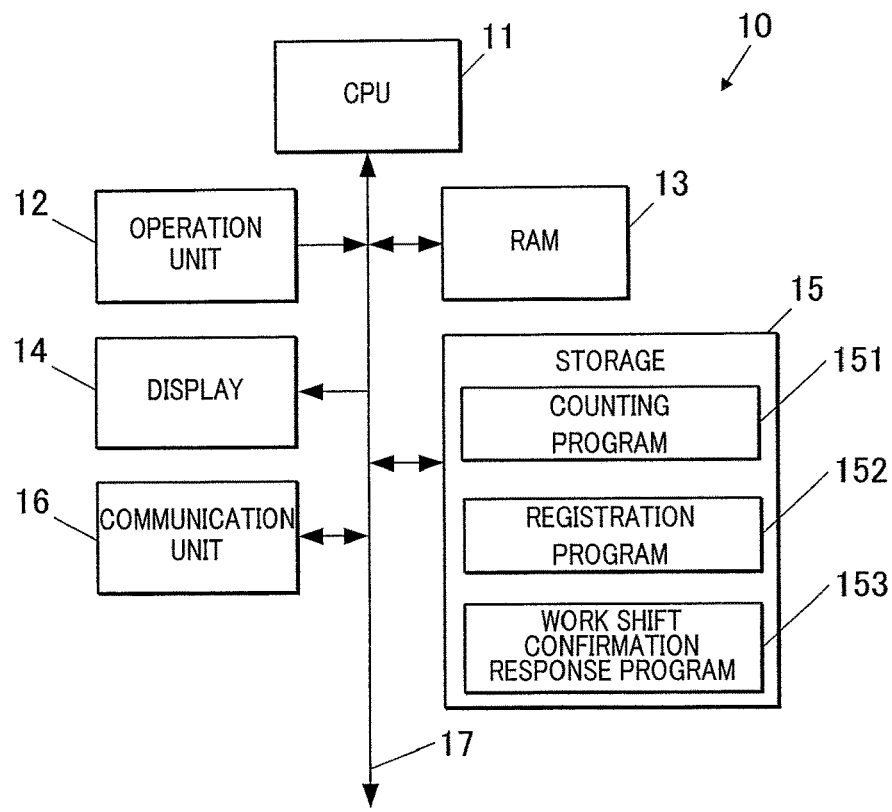
FIG. 2 is a block diagram showing a functional configuration of a server.
Figure 3:
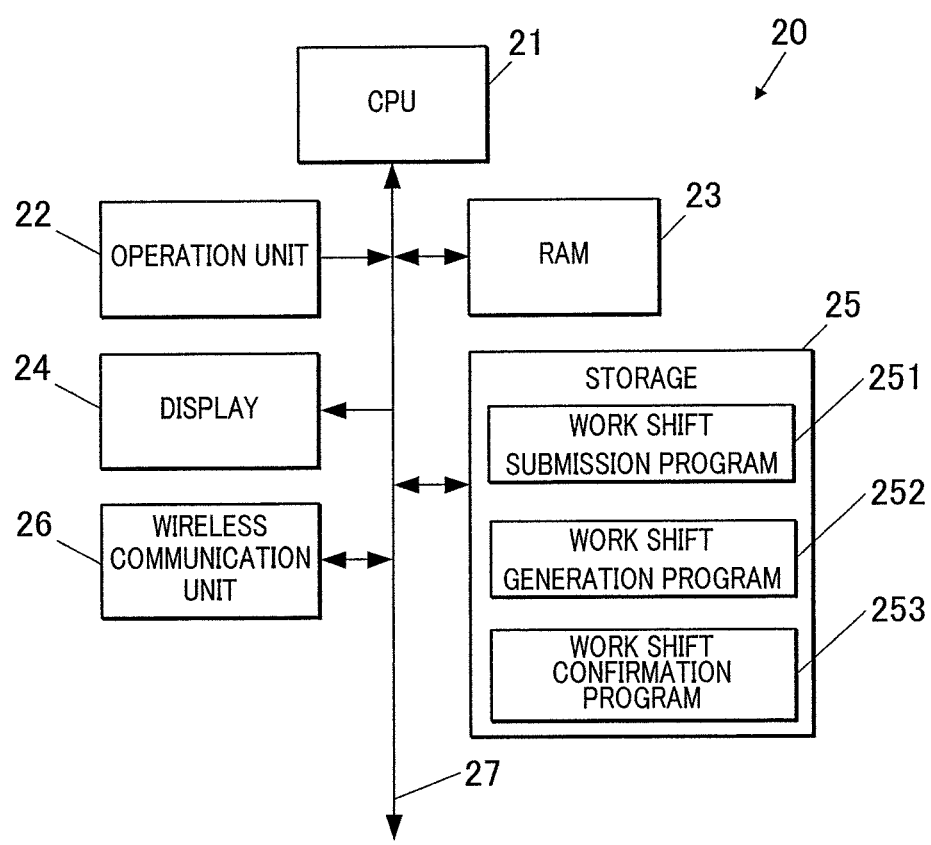
FIG. 3 is a block diagram showing a functional configuration of a terminal device.

As shown in FIG. 2, the server 10 includes a CPU (Central Processing Unit) 11 as a first to fourth display controllers, a designation unit and a counting unit, an operation unit 12, a RAM (Random Access Memory) 13, a display 14, a storage 15 and a communication unit 16. The components of the server 10 are connected with each other through a bus 17.

The CPU 11 controls each component of the server 10. The CPU 11 reads an instructed program among the system programs and application programs stored in the storage 15 to deploy in the RAM 13. The CPU 11 carries out a variety of processing in cooperation with these programs.

The operation unit 12 includes a key input unit such as a keyboard and a pointing device such as a mouse. The operation unit 12 receives a key input and a position input and outputs the operation information to the CPU 11.

The RAM 13 is a volatile memory. The RAM 13 constitutes a work area to store a variety of data and programs temporarily. The display 14 is constituted by an LCD (Liquid Crystal Display), an EL (Electroluminescence) display or the like. The display 14 shows various kinds of screen display in accordance with display information instructed by the CPU 11.

The storage 15 is constituted by a HDD (Hard Disk Drive), an SSD (Solid State Drive) or the like. The storage 15 is a storage which can read and write data and programs. In particular, the storage 15 stores a counting program 151, a registration program 152, a work shift confirmation response program 153, an employee DB (Data Base) 30 and a work shift DB 40 (the employee DB 30 and the work shift DB 40 will be described in the following).

The communication unit 16 is constituted by a network card or the like. The communication unit 16 is connected with the communication network N so as to communicate therewith and performs communication with devices on the communication network N. The CPU 11 can communicate with the terminal device 20 on the communication network N through the communication unit 16.

The functional configuration of the terminal device 20 will be described with reference to FIG. 3. FIG. 3 is a block diagram showing the functional configuration of the terminal device 20.

The terminal device 20 includes a CPU 21, an operation unit 22, a RAM 23, a display 24, a storage 25 and a wireless communication unit 26. The components of the terminal device 20 are connected with each other through a bus 27.

The CPU 21, the RAM 23 and the display 24 are similar to the CPU 11, the RAM 13 and the display 14 of the server 10. The same explanation will be omitted and the differences will be primarily described.

The CPU 21 controls each component of the terminal device 20. The operation unit 22 includes a touch panel provided on a display screen of the display 24, receives a touch input by a user and outputs the operation information to the CPU 21.

The storage 25 is constituted by a flash memory, an EEPROM (Electrically Erasable Programmable ROM) or the like. The storage 25 is a storage which can write and read data and programs. Specifically, the storage 25 stores a work shift submission program 251, a work shift generation program 252 and a work shift confirmation program 253.

The wireless communication unit 26 is constituted by an antenna, a modulation circuit, a demodulation circuit, a signal processing circuit, or the like. The wireless communication unit 26 wirelessly sends information to and receives information from base stations and access points on the communication network N, for example. Thus, the CPU 21 can communicate with the server 10 through the base stations and access points on the communication network N, for example.

The employee account DB 30 and the work shift DB 40 stored in the storage 15 of the server 10 will be described with reference to FIGS. 4 and 5. FIG. 4 is a view showing the configuration of the employee DB 30. FIG. 5 is a view showing the configuration of the work shift DB 40.

As shown in FIG. 4, the employee account DB 30 includes items of "EMPLOYEE No" 31, "NAME" 32, "POST" 33, "ROLE" 34, "PASSWORD" 35 and "SERVICE YEARS" 36.

"EMPLOYEE No" 31 is an identification number (user ID) to identify each employee. "NAME" 32 is the name of each employee. "POST" 33 is the post of each employee. "ROLE" 34 is the role (work) of each employee. "PASSWORD" 35 is the password to log in the work shift management application. "SERVICE YEARS" 36 is the service years of each employee.

As shown in FIG. 5, the work shift DB 40 includes items of "TIME SLOT" 41, "DATE" 42, "DISPLAY COLOR" 43, "NAME" 44, "DESIRED" 45, "DETERMINED" 46, "TOTAL (DESIRED)" 47, "TOTAL (DETERMINED)" 48 and "TOTAL (INDIVIDUAL)" 49. The work shift DB 40 is a data base which manages the desired work shift data submitted by each employee and the determined work shift data.

"TIME SLOT" 41 is a time slot in business hours. The time slots include "LUNCH", "DINNER" and "LATE AT NIGHT". "DATE" 42 is the date of a business day. "DISPLAY COLOR" 43 is a display color (letter color) for displaying the number of employees assured to work, who are assured to operate, on a determined work input form F2 (refer to FIG. 14A) and a determined work shift F4 for a manager's review (refer to FIGS. 18A, 18B and 18C). The display colors include "BLACK" which indicates the number of employees is sufficient, "RED" which indicates the number of employees is not enough and "BLUE" which indicates the number of employees is too many. In the drawing, the number in "RED" is shown in boldface (for example, the number "3" of the employees assured to work on Jan. 11, 2015). Also, the number in "BLUE" is shown by outline number characters (for example, the number "5" of the employees assured to work on Jan. 1, 2015).

"NAME" 44 is the name of each employee. "DESIRED" 45 is a response of each employee who desires attendance or absence. In "DESIRED" 45, the information describing a "∘" sign is recorded when an employee can work, the information describing a "Δ" sign is recorded when the employee cannot decide whether he/she can work and the information describing a "x" sign is recorded when the employee cannot work. "DETERMINED" 46 is the determined work shift for each employee. In "DETERMINED" 46, the information describing a "∘" sign is recorded when the employee will work and the information describing a "x" sign is recorded when the employee will not work.

"TOTAL (DESIRED)" 47 is a sum of the number of the "∘" signs recorded in item "DESIRED" 45 for each business day. That is, "TOTAL (DESIRED)" 47 is the sum of the number of employees who can work on each business day. "TOTAL (DETERMINED)" 48 is a sum of the number of "∘" signs recorded in item "DETERMINED" 46 for each business day. That is, "TOTAL (DETERMINED)" 48 is the sum of the number of employees who work on each business day. "TOTAL (INDIVIDUAL)" 49 shows the sum of the number of "∘" signs recorded in item "DESIRED" 45 and the sum of the number of "∘" signs recorded in item "DETERMINED" 46. That is, "TOTAL (INDIVIDUAL)" 49 shows desired working days and determined working days of each employee.

The operation of the work shift management system 1 will be described with reference to FIGS. 6A to 21C.

Figure 7A:
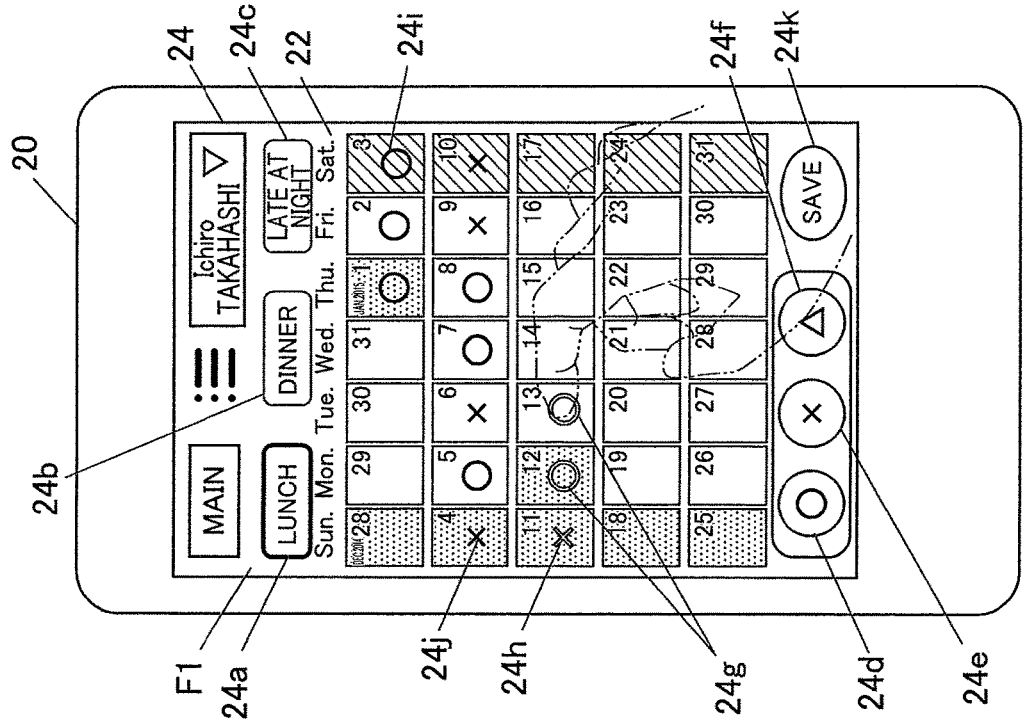
FIG. 7A is a view showing an example of a display of the terminal device when the work shift submission processing is carried out and showing an example of the display of the terminal device when Ichiro Takahashi logs in with his own user ID.
Figure 7B:
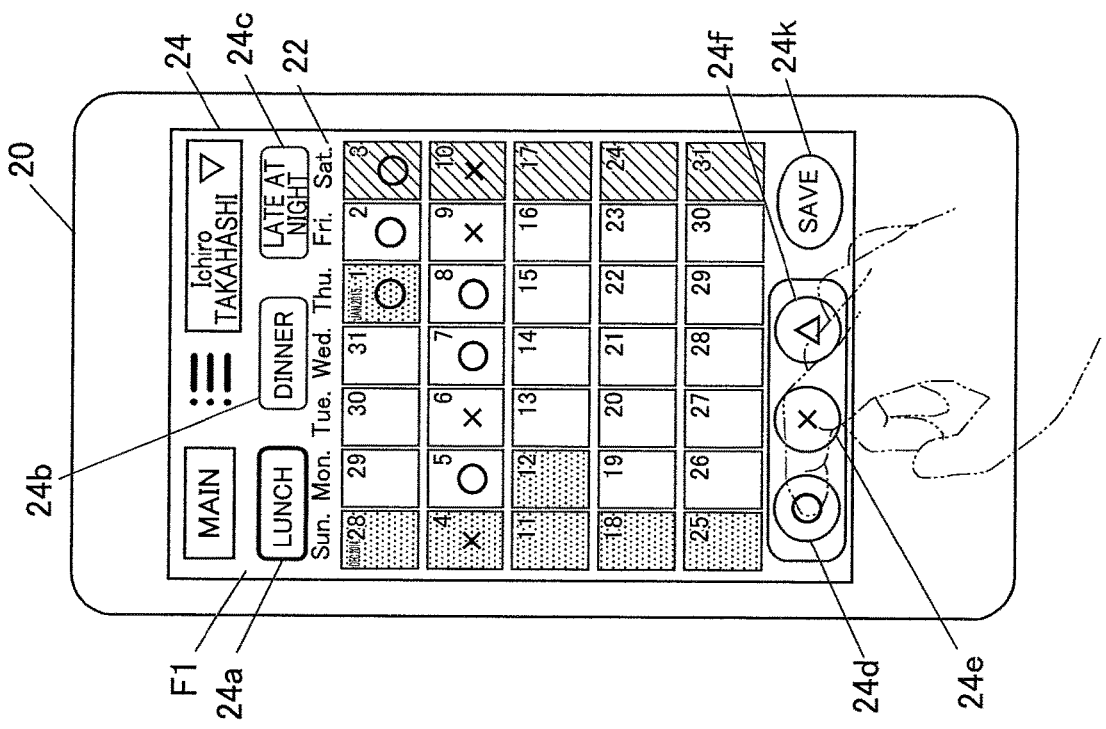
FIG. 7B is a view showing an example of the display of the terminal device when the work shift submission processing is carried out and showing an example of the display of the terminal device when Ichiro Takahashi logs in with his own user ID.
Figure 8:
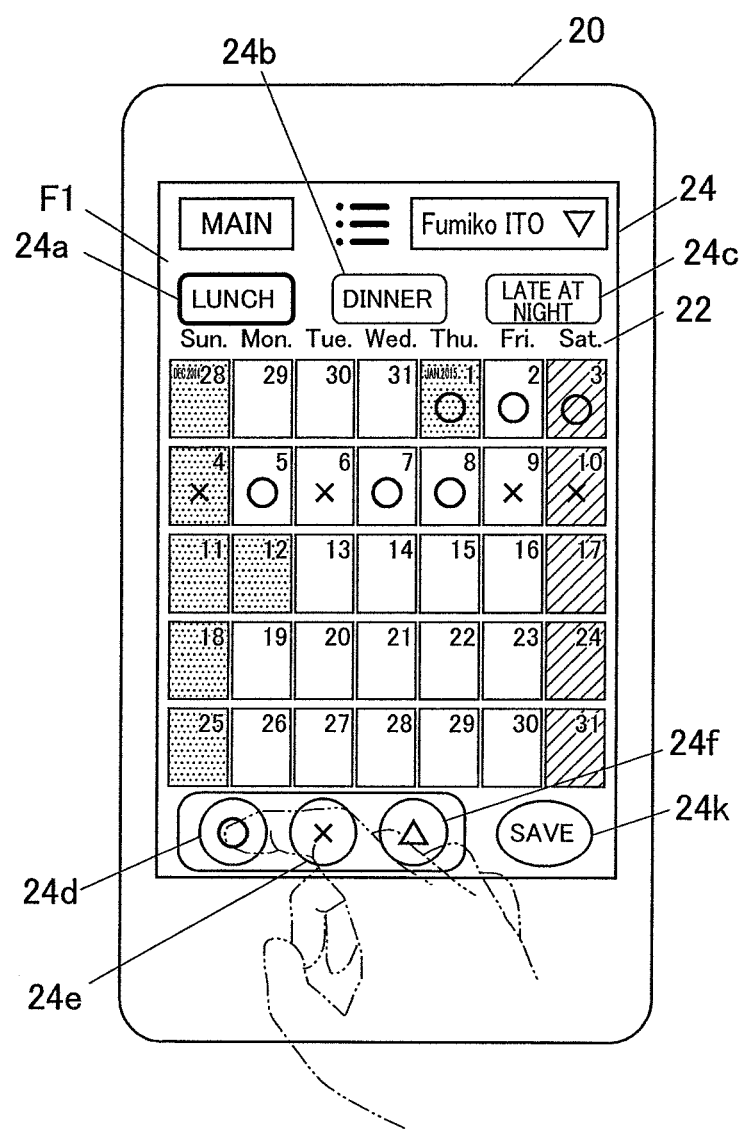
FIG. 8 is a view showing an example of the display of the terminal device when the work shift submission processing is carried out and showing an example of the display of the terminal device when Fumiko Ito logs in with her own user ID.

With reference to FIGS. 6A to 10C, the operation from the submission of a desired work shift by each employee to the counting of the desired work shifts among the operation of the work shift management system 1 will be described. FIG. 6A is a flowchart showing work shift submission processing. FIG. 6B is a flowchart showing counting processing. FIGS. 7A and 7B are views each showing an example of a display screen of the terminal device 20 when the work shift submission processing is carried out. FIGS. 7A and 7B are views each showing an example of the screen display of the terminal device 20 when Ichiro Takahashi logs in the terminal device 20 with his own user ID. FIG. 8 is a view showing an example of the display screen of the terminal device 20 when the work shift submission processing is carried out. FIG. 8 is a view showing an example of the display screen of the terminal device 20 when Fumiko Ito logs in the terminal device 20 with her own user ID. FIGS. 9A, 9B and 9C are views each showing an example of the display screen after Ichiro Takahashi inputs desired work shifts to the input form for each working time slot. FIGS. 10A, 10B and 10C are views each showing an example of the display screen after Fumiko Ito inputs desired work shifts to the input form for each working time slot.

With reference to FIG. 6A, the work shift submission processing which is carried out by the terminal device 20 will be described. In the work shift submission processing, an employee inputs working day information describing a desired working day (desired work shift data) in a working day input form sent from the server 10 and submits (sends) to the server 10. The work shift submission processing is primarily carried out by the terminal device 20 owned by an employee.

When the work shift submission processing is instructed to be carried out in the terminal device 20 via the operation unit 22 as a trigger, the CPU 21 carries out the work shift submission processing in cooperation with the work shift submission program 251 read from the storage 25 and deployed in the RAM 23 in an appropriate manner. Specifically, for example, when item "SUBMIT WORK SHIFT" is selected and input, via the operation unit 22, on a menu display screen displayed on the display 24 as a trigger, the CPU 21 carries out the work shift submission processing. In this case, the terminal device 20 is assumed to already log in the work shift management application. In the following, when the work shift generation processing (refer to FIG. 11A) and the work shift confirmation processing (refer to FIG. 17A) are carried out, the terminal device 20 is also assumed to already log in the work shift management application.

First, the CPU 21 sends working day input form request information which requests working day input form data for an employee to input working day information describing desired working day to the server 10 (Step S11). The working day input form is an input form for an employee to input the working day information describing the desired working day (desired work shift data).

The CPU 21 receives, via the wireless communication unit 26, the working day input form data from the server 10 (Step S12). The CPU 21 displays, based on the working day input form data received in Step S12, working day input form F1 (refer to FIGS. 7A, 7B and 8) in the form of monthly calendars (calendar of each month) which are separate from each other depending on working time slots "LUNCH", "DINNER" and "LATE AT NIGHT" (Step S13). In Step S13, an initial configuration is set such that the working day input form F1 for the time slot "LUNCH" is displayed first, for example.

FIG. 7A shows the state where the working day input form F1 for the time slot "LUNCH" is displayed on the display screen of the terminal device 20 which an employee "Ichiro TAKAHASHI" logs in. FIG. 8 shows the state where the working day input form F1 for the time slot "LUNCH" is displayed on the display screen of the terminal device 20 which an employee "Fumiko ITO" logs in. In the working day input forms F1 shown in FIGS. 7A and 8, the work shifts from Jan. 1, 2015 to Jan. 10, 2015 have already been determined, and the desired work shift on and after January 11 is possible to be input.

The CPU 21 receives the input of working day information via the operation unit 22 (Step S14). The working day information is constituted by information describing a time slot, information describing a date and information describing a desired response as to attendance or absence. FIGS. 7A and 7B are views each showing an example of the input operation of the working day information by the operation unit 22. As shown in 7A, in a state where the working day input form F1 for the working time slot "LUNCH" is shown (a state where the frame of "LUNCH" button 24a is shown as a thick frame), when the employee "Ichiro TAKAHASHI" carries out a touch operation on a "○" button 24d among the "○" button 24d, "Δ" button 24e and "x" button 24f via the operation unit 22, for example, the state where the "○" button is selected describing that he desires to work. (The "○" button 24d is touched when an employee can work, the "Δ" button 24e is touched when the employee cannot decide whether he/she can work and the "x" button 24f is touched when the employee cannot work.) Next, as shown in FIG. 7B, when the employee "Ichiro TAKAHASHI" carries out a touch operation on the field of Jan. 13, 2015 (mark attachment area), a state where a "○" mark 24g is attached to the field is displayed, and the information describing the response "○" as to the attendance or absence on the date "Jan. 13, 2015" is input. In the drawing, outline marks (for example, "x" mark 24h on Jan. 11, 2015 and "○" marks 24g on January 12 and 13, 2015) describe the state where whether to work or not has not been determined. In the registration processing of the server 10 described below, determined work information is recorded in the shift DB 40, whether to work or not is determined, and the marks are updated to normal marks 24i, 24j. Specifically, for example, when a work is determined as an employee desires, the outline "○" mark 24g is updated to the normal "○" mark 24i. On the other hand, when a work is not determined as an employee desires, the outline "○" mark 24g is updated to the normal "x" mark 24j. The outline mark is actually displayed in blue, for example. The normal mark is displayed in black (determination display color).

When the employee "Ichiro TAKAHASHI" attaches "○" mark 24g or "x" mark 24h to each of fields of Jan. 11, 2015 to Jan. 31, 2015, the working day input form F1 becomes a state where the input of desired work shifts for working time slot "LUNCH" is finished as shown in FIG. 9A. Next, for example, when a touch operation is carried out on "DINNER" button 24b, the display is switched to the work day input form F1 for working time slot "DINNER" as shown in FIG. 9B. With respect to this work day input form F1, when "○" mark 24g or "x" mark 24h is attached to each of field of Jan. 11, 2015 to Jan. 31, 2015, the working day input form F1 for working time slot "DINNER" becomes a state where the input of desired work shifts is finished. Further, for example, when a touch operation is carried out on "LATE AT NIGHT" button 24c, the display is switched to the work day input form F1 for working time slot "LATE AT NIGHT" as shown in FIG. 9C. With respect to this work day input form F1, when "○" mark 24g or "x" mark 24h is attached to each of fields of Jan. 11, 2015 to Jan. 31, 2015, the working day input form F1 for time slot "LATE AT NIGHT" becomes a state where the input of desired work shifts is finished. FIGS. 10A, 10B and 10C respectively show an example of the display screen after "Fumiko ITO" inputs desired working shifts to the working day input form F1 for working time slots "LUNCH", "DINNER" and "LATE AT NIGHT".

As shown in FIGS. 9A, 9B and 9C, for example, when a touch operation is carried out on "SAVE" button 24k via the operation unit 22 in a state where the input of the desired working shift to the working day input form F1 for each of work time slots "LUNCH", "DINNER" and "LATE AT NIGHT" is finished, the CPU 21 sends via the wireless communication unit 26 the working day information input at Step S14 to the server 10 (information describing a time slot, information describing a date and information describing a desired response as to attendance or absence) (Step S15) and ends the shift submission processing.

With reference to FIG. 6B, the counting processing which is carried out in the server 10 will be described. The counting processing is processing in which the number of employees who wish to work is counted based on the working day information (desired work shift data) sent from each terminal device 20 in accordance with the shift submission processing carried out on the terminal device 20.

When the server 10 receives, via the communication unit 16, the working day input form request information received from the terminal device 20 corresponding to Step S11 in FIG. 6A as a trigger, the CPU 11 carries out the counting processing in cooperation with the counting program 151 which is read from the storage 15 and deployed in the RAM 13 in an appropriate manner.

First, the CPU 11 sends the working day input form data to the terminal device 20 via the communication unit 16 (Step S21). Then, the CPU 11 receives the working day information via the communication unit 16 (Step S22). The CPU 11 stores the working day information received at Step S22 in the work shift DB 40 (Step S23). Specifically, the CPU 11 stores information describing a desired response as to attendance or absence ("○", "x" or "Δ") in item "desired" 45 of an employee who submits (sends) the working day information (for example, Ichiro Takahashi). The CPU 11 counts the total number of the employees who wishes to work in each time slot of each date (i.e., the total number of pieces of information describing "○") (Step S24) and ends the counting processing.

Figure 11A:
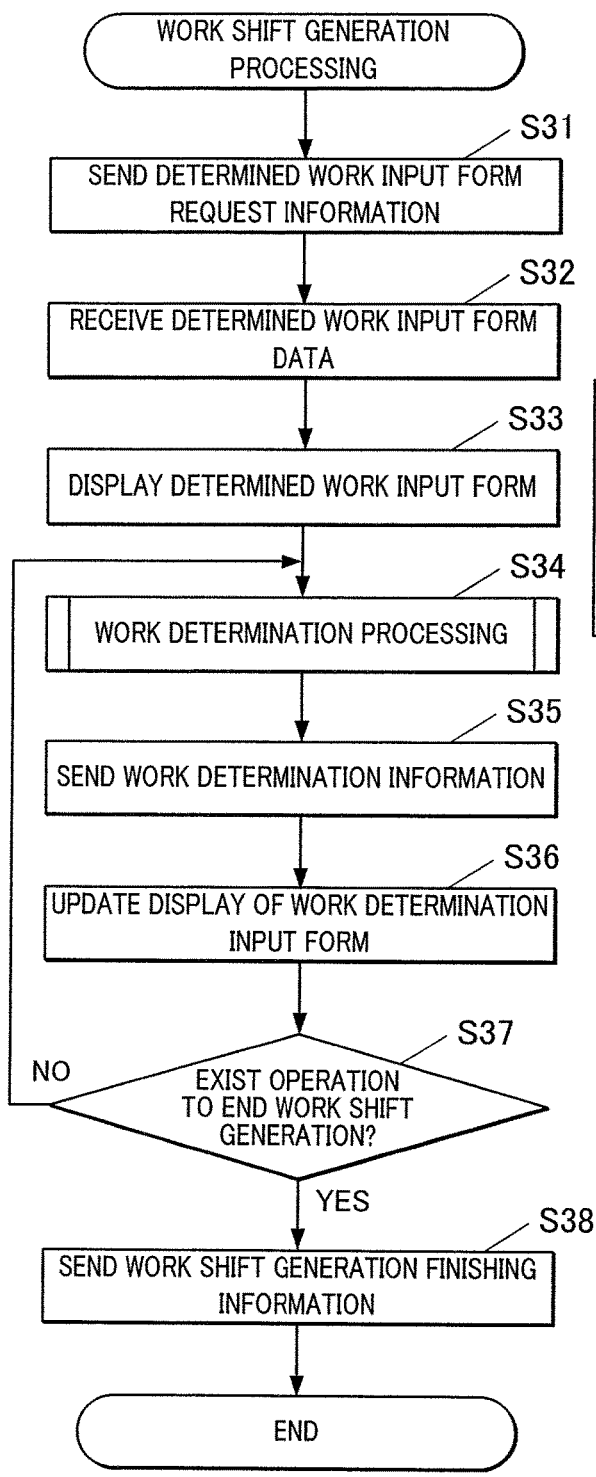
FIG. 11A is a flowchart showing work shift generation processing.
Figure 11B:
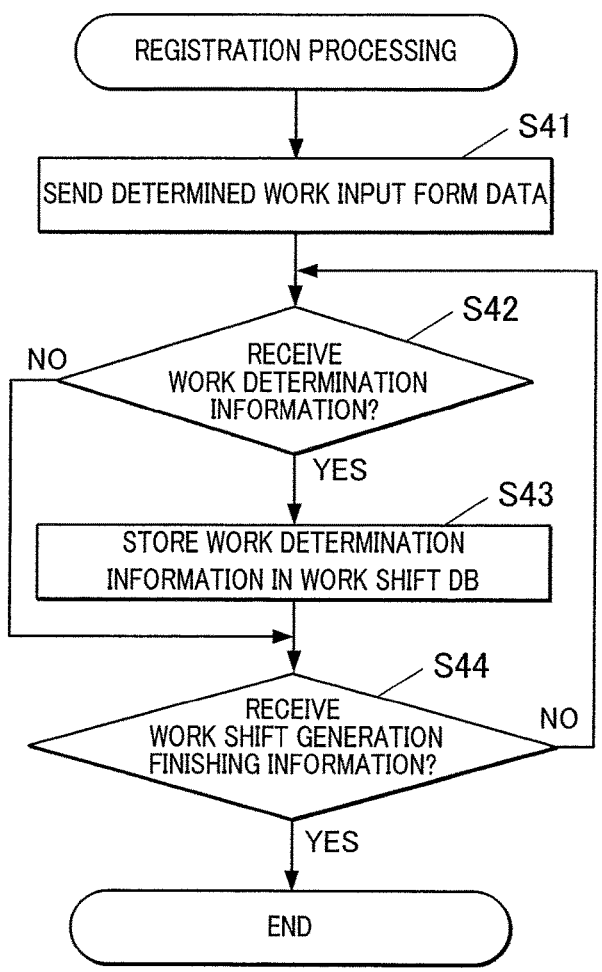
FIG. 11B is a flowchart showing registration processing.
Figure 12:
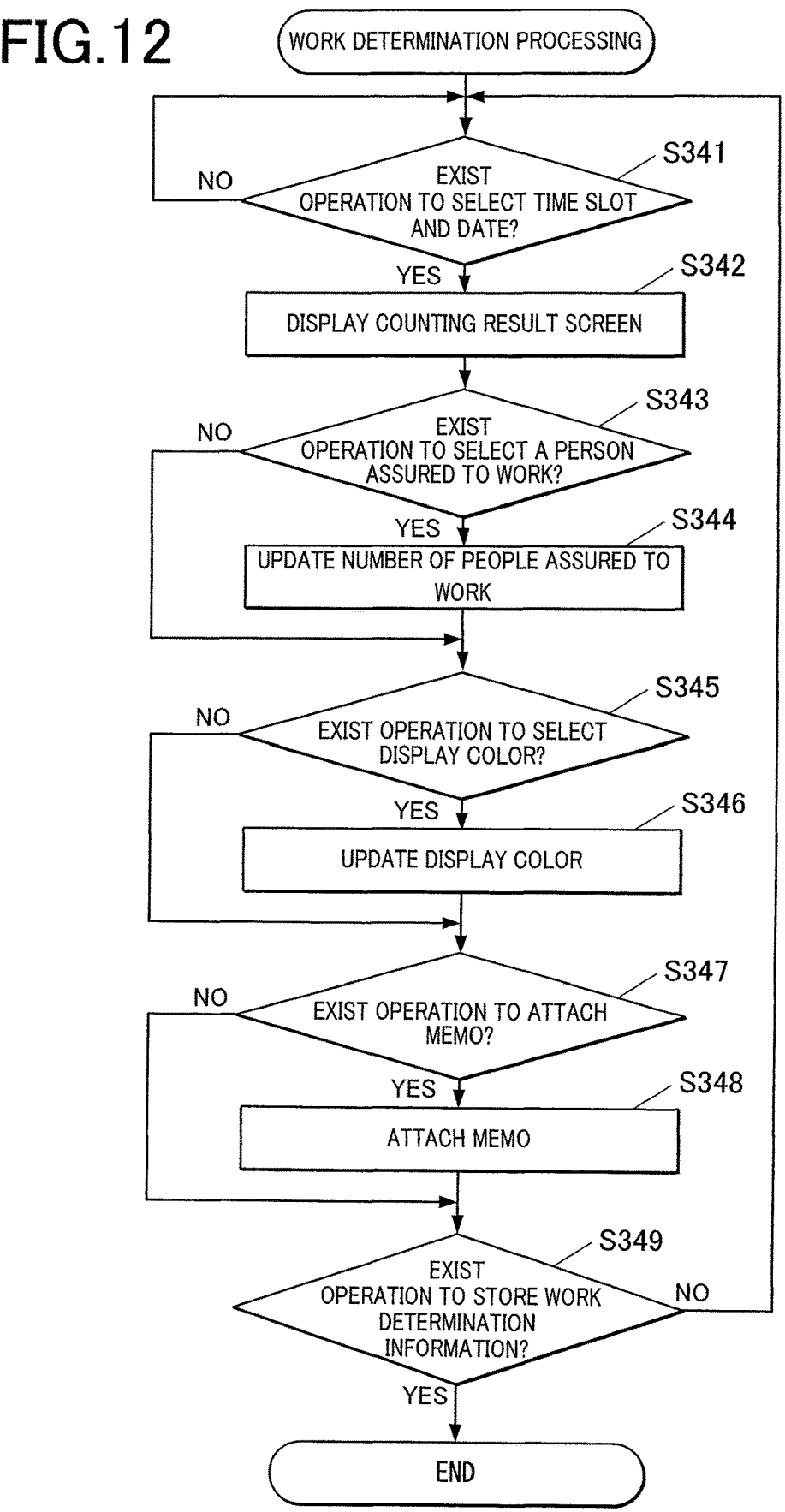
FIG. 12 is a flowchart showing work determination processing.

With reference to FIGS. 11A to 16, operation from the generation (determination) of a work shift to the registration of the work shift among the operations carried out by the work shift management system 1 will be described. FIG. 11A is a flowchart showing work shift generation processing. FIG. 11B is a flowchart showing registration processing. FIG. 12 is a flowchart showing work determination processing. FIGS. 13A, 13B and 13C are views each showing an example of a determined work input form. FIGS. 14A to 16 are views each showing an example of the display screen of the terminal device 20 when the work shift generation processing is carried out.

With reference to FIG. 11, the work shift generation processing which is carried out by the terminal device 20 will be explained. The work shift generation processing is processing in which a work shift is generated based on the counting result of the number of employees who wish to work. The shift generation processing is primarily carried out by the terminal device owned by the manager.

When the instruction to carry out the work shift generation processing is input to the terminal device 20 via the operation unit 22 as a trigger, the CPU 21 carries out the work shift generation processing in cooperation with the work shift generation program 252 read from the storage 25 and deployed in the RAM 23 in an appropriate manner. Specifically, for example, when the instruction to select item "WORK SHIFT GENERATION" is input on the menu display screen via the operation unit 22 as a trigger, the CPU 21 carries out the work shift generation processing.

First, the CPU 21 sends determined work input form request information which requests determined work input form data to determine the employees who will work to server 10 via the wireless communication unit 26 (Step S31).

Figures 13A, 13B, 13C:
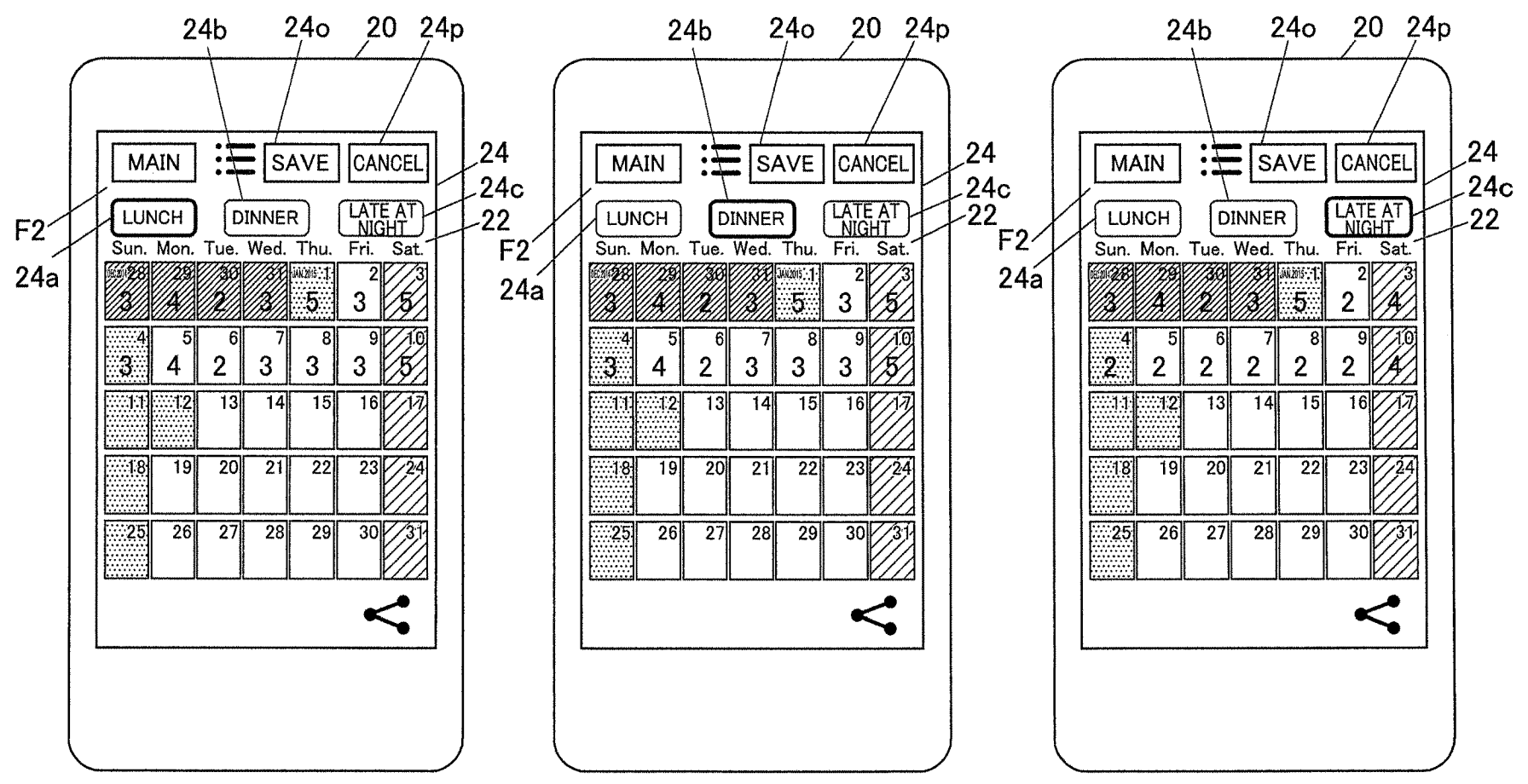

The CPU 21 receives the determined work input form data from the server 10 via the wireless communication unit 26 (Step S32). The CPU 21 displays, based on the determined work input form data received in Step S32, determined work input form F2 (refer to FIGS. 13A, 13B and 13C) in the form of monthly calendars (calendars of each month) which are separate from each other corresponding to the working time slots "LUNCH", "DINNER" and "LATE AT NIGHT" on the display 24 (Step S33). As shown in FIGS. 13A, 13B and 13C, on the determined work input form F2, the determined number of employees who will work is shown in the field of the date on which date the number of the employees who will work is determined, and the blank state is shown in the field of the date on which date the number of the employees who will work is not determined.

Figure 16:
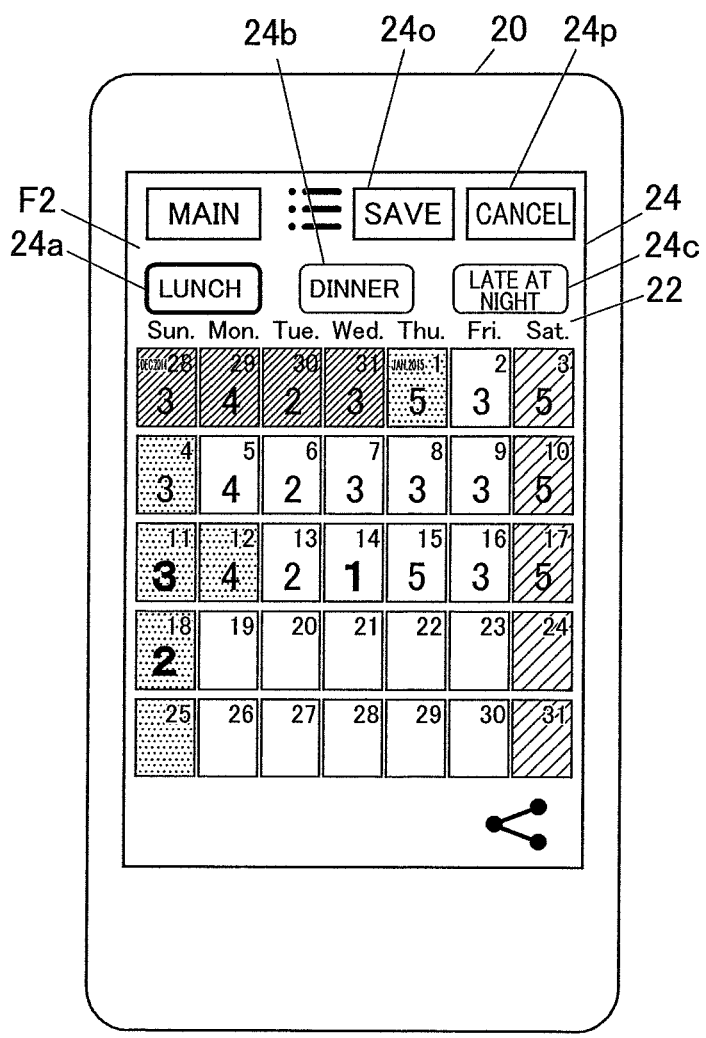
FIG. 16 is a view showing an example of screen display of the terminal device when the work shift generation processing is carried out.

The CPU 21 carries out work determination processing (Step S34). The detail of the work determination processing will be described in the following. The CPU 21 sends the work determination information input in the work determination processing in Step S34 to the server 10 (Step S35). The CPU 21 updates the display of determined work input form F2 displayed on the display 24 and displays the number of persons assured to work (employee assured to work) in the field of the date to which date the work determination processing described above is carried out. Specifically, in the work determination processing described below, for example, when the number of employees who will work in the time slot LUNCH on Jan. 18, 2015 is determined to be two, "2" is displayed in the field of the date Jan. 18, 2015 of the determined work input form F2 of the working time slot "LUNCH" as shown in FIG. 16 to show that it is determined that the number of employees who will work is two as shown in FIG. 16. "2" displayed in the field of the date of Jan. 18, 2015 is in "red (expressed in boldface in the drawing)" similarly to the numbers displayed in the fields of the date January 11 and 14, 2015. The red color indicates that the number of persons is not enough.

The CPU 21 determines if instructions via the operation unit 22 to end the work shift generation is input (Step S37).

When it is determined that instructions to end the work shift generation is not input in Step S37 (Step S37; NO), the flow shifts the processing back to Step S34 and the CPU 21 carries out the processing in and after Step S34.

When it is determined that instructions to end the work shift generation is input (Step S37; YES), the CPU 21 sends work shift generation finishing information to the server 10 via the wireless communication unit 26 (Step S38), and ends the work shift generation processing. Specifically, as shown in FIGS. 13A, 13B and 13C, when a touch operation is carried out on "SAVE" button 24o provided at the upper part of the determined work input form F2, finishing the work shift generation is instructed.

With reference to FIG. 12, the work determination processing carried out in the terminal device 20 will be described. First, the CPU 21 determines if instruction to select a time slot and a date is input via the operation unit 22 (Step S341).

When it is determined that the instructions to select a time slot and a date is not input in Step S341 (Step S341; NO), the CPU 21 repeatedly carries out the determination processing of Step S341.

Figure 14B:
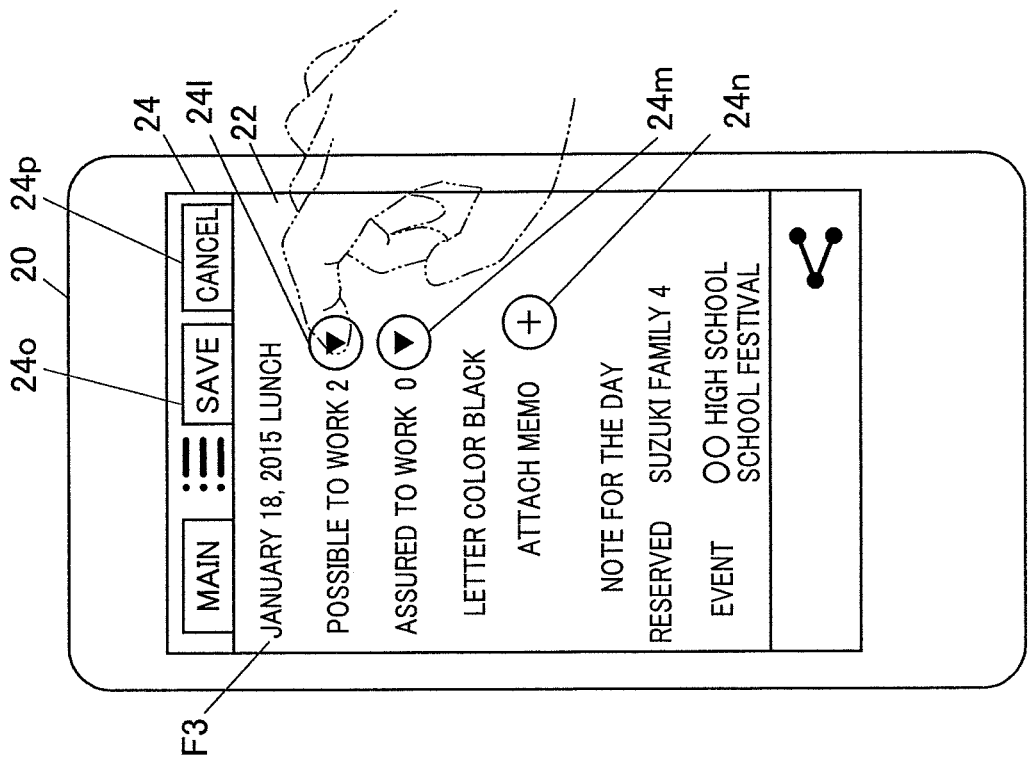
FIG. 14B is a view showing an example of screen display of the terminal device when the work shift generation processing is carried out.
Figure 14A:
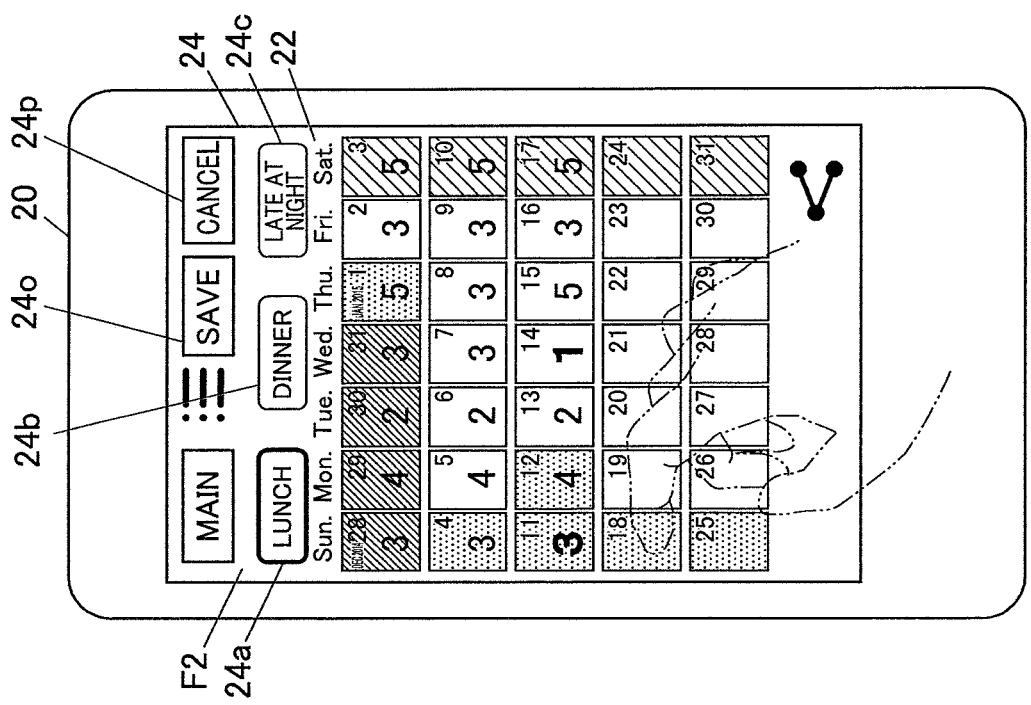
FIG. 14A is a view showing an example of screen display of the terminal device when work shift generation processing is carried out.

When it is determined that the instruction to select a time slot and a date is input in Step S341 (Step S341; YES), the CPU 21 displays on the display 24 a counting result screen F3 (refer to FIG. 14B) corresponding to the time slot and date selected in Step S341 (Step S342). Specifically, as shown in FIG. 14A, in a state where the determined work input form F2 of a time slot "LUNCH" is displayed on the display 24, for example, when a manager carries out a touch operation on the field of the date (slot of time) corresponding to Jan. 18, 2015, the counting result screen F3 of the time slot of lunch of Jan. 18, 2015 will be displayed as shown in FIG. 14B.

The CPU 21 determines if instructions to select a person assured to work is input on the counting result screen F3 (Step S343).

Figure 15B:
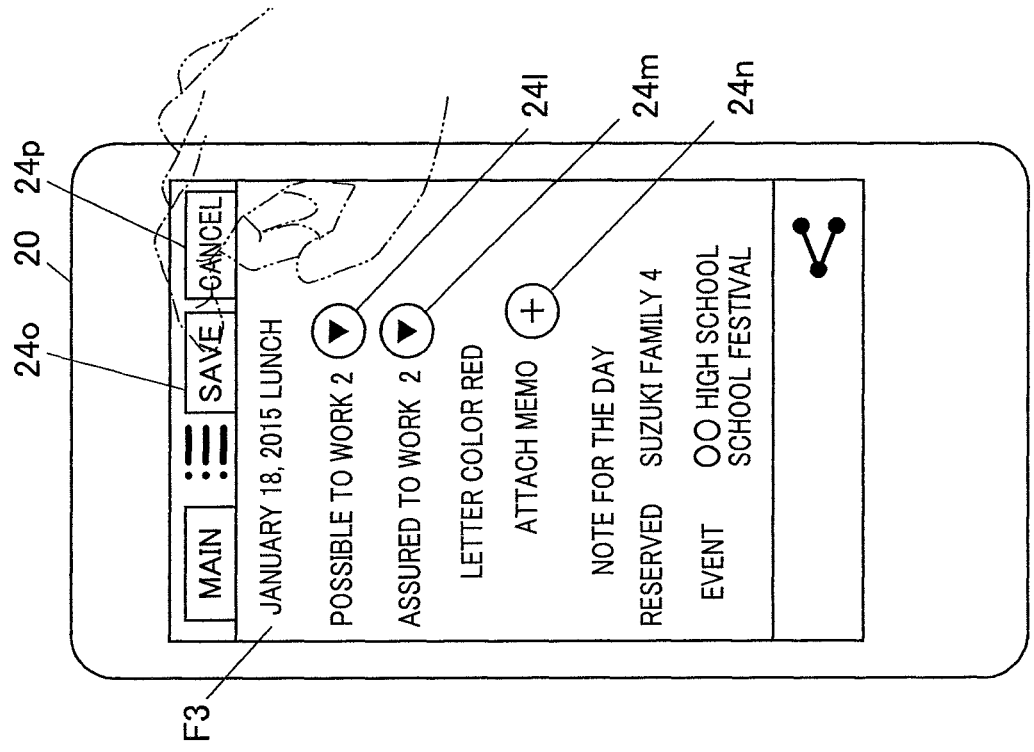
FIG. 15B is a view showing an example of screen display of the terminal device when the work shift generation processing is carried out.
Figure 15A:
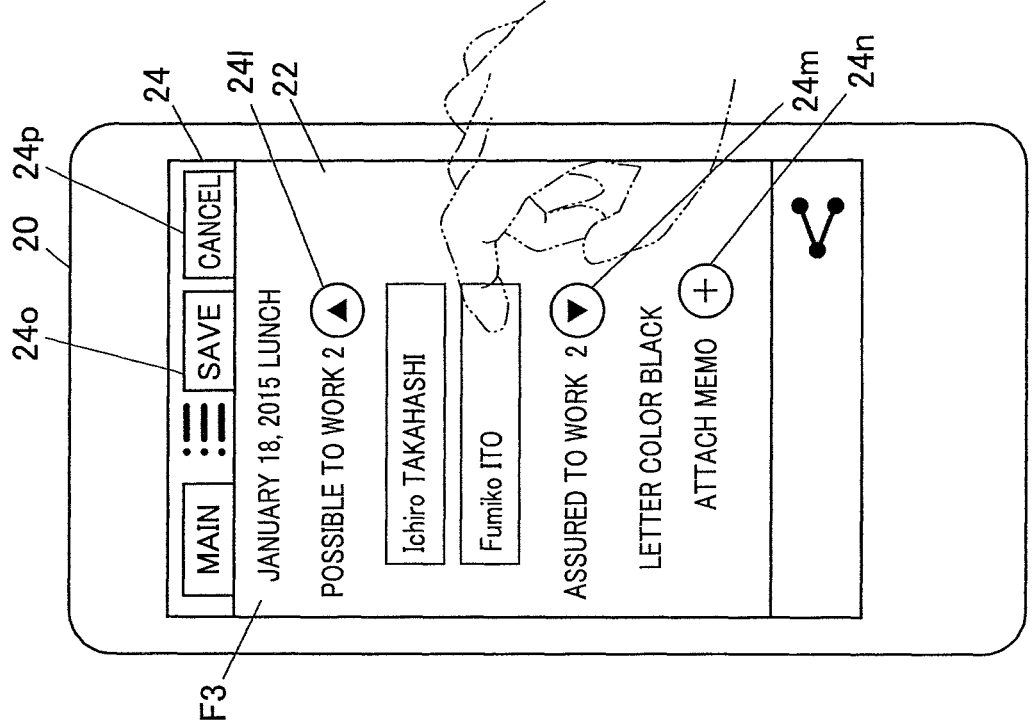
FIG. 15A is a view showing an example of screen display of the terminal device when the work shift generation processing is carried out.

When it is determined that the instructions to select a person assured to work is input in Step S343 (Step S343; YES), the CPU 21 updates the display of the number of persons assured to work (Step S344) and shifts the processing to Step S345. Specifically, as shown in FIG. 14B, on the counting result screen F3, when a manager carries out a touch operation on an encircled ▼ button 24*l* which is shown on the right side of the description "POSSIBLE TO WORK 2", the names of the employees who are possible to work "Ichiro TAKAHASHI" and "Fumiko ITO" are displayed below the description "POSSIBLE TO WORK 2" as shown in FIG. 15A. When the manager carries out a touch operation on the display areas of "Ichiro TAKAHASHI" and "Fumiko ITO", the number of the person assured to work is updated from "0" to "2". When the manager carries out a touch operation on an encircled ▼ button 24m which is shown on the right side of the description "ASSURED TO WORK 2", the names of the employees who are assured to work "Ichiro TAKAHASHI" and "Fumiko ITO" are displayed below the description "ASSURED TO WORK 2" (not shown).

When it is determined that instructions to select a person assured to work is not input in Step S343 (Step S343; NO), the CPU 21 skips Step S344 and shifts the processing to Step S345.

The CPU 21 determines if instructions via the operation unit 22 to select a display color (letter character) is input (Step S345). The display color (letter character) is a color which is used when the display of the number of persons assured to work is updated in each field of a date (slot of time) in the determined work input form F2 (refer to FIG. 16).

When it is determined that instructions to select a display color is input in Step S345 (Step S345; YES), the CPU 2:1 updates the display color (Step S346) and shifts the processing to Step S347. Specifically, as shown in FIG. 15A, when a manager carries out a touch operation on the display area of "LETTER COLOR BLACK" displayed on the counting result screen F3, a selection screen on which "LETTER COLOR RED" or "LETTER COLOR BLUE" other than "LETTER COLOR BLACK" can be selected (not shown). When a manager carries out a touch operation on "LETTER COLOR RED", for example, on the selection screen, "LETTER COLOR BLACK" is updated to "LETTER COLOR RED" as shown in FIG. 15B.

When it is determined that instructions to select a display color is not input (Step S345; NO), the CPU 21 skips Step S346 and shifts the processing to Step S347.

The CPU 21 determines if instructions via the operation unit 22 to attach a memo is input (Step S347).

When it is determined that instructions to attach a memo is input in Step S347 (Step S347; YES), the CPU 21 attaches a memo (Step S348) and shifts the processing to Step S349. Specifically, as shown in FIGS. 15A and 15B, when a manager carries out a touch operation on an encircled+ button 24n on the right side of "ATTACH A MEMO" displayed on the counting result screen F3, a text input screen is displayed, for example (not shown). When the manager inputs memo information such as "Mr. ∘∘, early leaving at 14:00", the memo can be attached.

When it is determined that instructions to attach a memo is not input in Step S347 (Step S347; NO), the CPU 21 skips Step S348 and shifts the processing to Step S349.

The CPU 21 determines if instructions via the operation unit 22 to store the work determination information is input (Step S349). The work determination information is information describing information of the name of an employee who is assured to work, information describing display color (letter color) and information describing the contents of a memo.

When it is determined that instructions to store the work determination information is input (Step S349; YES), the CPU 21 ends the work determination processing. Specifically, as shown in FIG. 15B, when a manager carries out a touch operation on "SAVE" button 24o displayed on the counting result screen F3, instructions to store the work determination information is input. When a manager carries out a touch operation on "CANCEL" button 24p provided on the right side of "SAVE" button 24o, the work determination information can be cancelled (reset) while the work determination information is being input.

When it is determined that instructions to store the work determination information is not input in Step S349 (Step S349; NO), the CPU 21 shifts the processing to Step S341 and carries out the processing in and after Step S341.

With reference to FIG. 11B, the registration processing carried out in the server 10 will be described. The registration processing is processing to register work determination information in response to the work shift generation processing carried out in the terminal device 20.

When the server 10 receives, via the communication unit 16, the determined work input form request information from the terminal device 20 corresponding to Step S31 shown in FIG. 11A as a trigger, the CPU 11 carries out the registration processing in cooperation with the registration program 152 which is read from the storage 15 and is deployed in the RAM in an appropriate manner.

First, the CPU 11 sends, via the communication unit 16, the determined work input form data to the terminal device 20 (Step S41). The CPU 11 determines if the work determination information is received from the terminal device 20 via the communication unit 16 (Step S42).

When it is determined that the work determination information is received (Step S42; YES), the CPU 11 stores the work determination information in the work shift DB 40 (Step S43) and shifts the processing to Step S44. Specifically, information describing "○" which means YES is stored in item "DETERMINED" 46 of an employee who is a person assured to work of corresponding "TIME SLOT" 41 and "DATE" 42. Information describing "x" which means NO is stored in item "DETERMINED" 46 of an employee who will not work. Also, information describing display color is stored in item "DISPLAY COLOR" 43 of corresponding "TIME SLOT" 41 and "DATE" 42. Further, when there is information describing the contents of a memo, the information describing the contents of a memo is stored.

When it is determined that work determination information is not received (Step S42; NO), the CPU 11 skips Step S43 and shifts the processing to Step S44. The CPU 11 determines if the work shift generation finishing information is received from the terminal device 20 via the communication unit 16 (Step S44).

When it is determined that the work shift generation finishing information is not received in Step S44 (Step S44; NO), the CPU 11 shifts the processing back to Step S42 and carries out the processing in and after Step S42.

When it is determined that the work shift generation finishing information is received in Step S44 (Step S44; YES), the CPU 11 ends the registration processing.

Figure 17A:
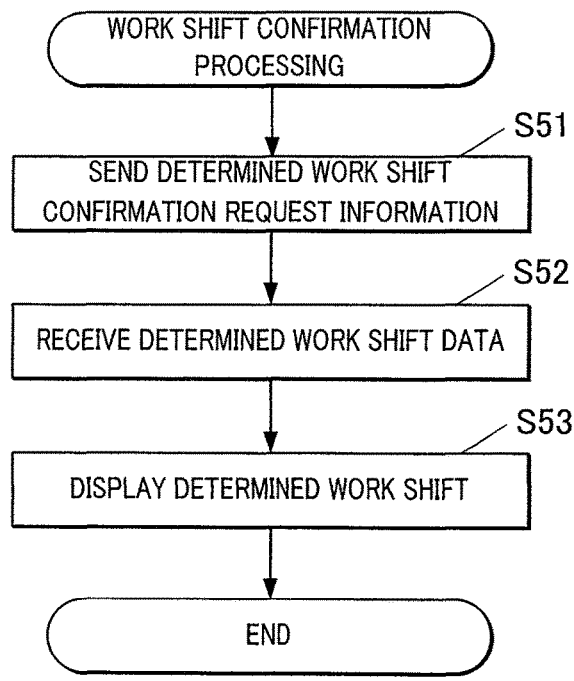
FIG. 17A is a flowchart showing work shift confirmation processing.

With reference to FIGS. 17A to 21C, the operation of confirming a determined work shift among the operations of the work shift management system 1 will be described. FIG. 17A is a flowchart showing work shift confirmation processing. FIG. 17B is a flowchart showing work shift confirmation response processing. FIG. 18A to 21C are views each showing an example of the display screen of the terminal device 20 when the work shift confirmation processing is carried out.

With reference to FIG. 17A, the work shift confirmation processing carried out in the terminal device 20 will be described. The work shift confirmation processing is processing which requests the server 10 to display the determined work shift on the display 24.

When the instructions to carry out the work shift confirmation processing is input via the operation unit 22 as a trigger, the CPU 21 carries out the work shift confirmation processing in cooperation with the work shift confirmation program 253 which is read from the storage 25 and is deployed in the RAM 23 in an appropriate manner. Specifically, when item "CONFIRM WORK SHIFT" on a menu display screen is selected and instructed as a trigger, the CPU 21 carries out the work shift confirmation processing.

First, the CPU 21 sends, via the wireless communication unit 26, determined work shift confirmation request information to the server 10 (Step S51). The determined work shift confirmation request information includes information describing an employee number input by a user when the user logs in the work shift management application on the terminal device 20.

The CPU 21 receives determined work shift data from the server 10 via the wireless communication unit 26 (Step S52). The CPU 21 displays the determined work shift on the display 24 based on the determined work shift data received in Step S52 (Step S53) and ends the work shift confirmation processing.

Figure 19:
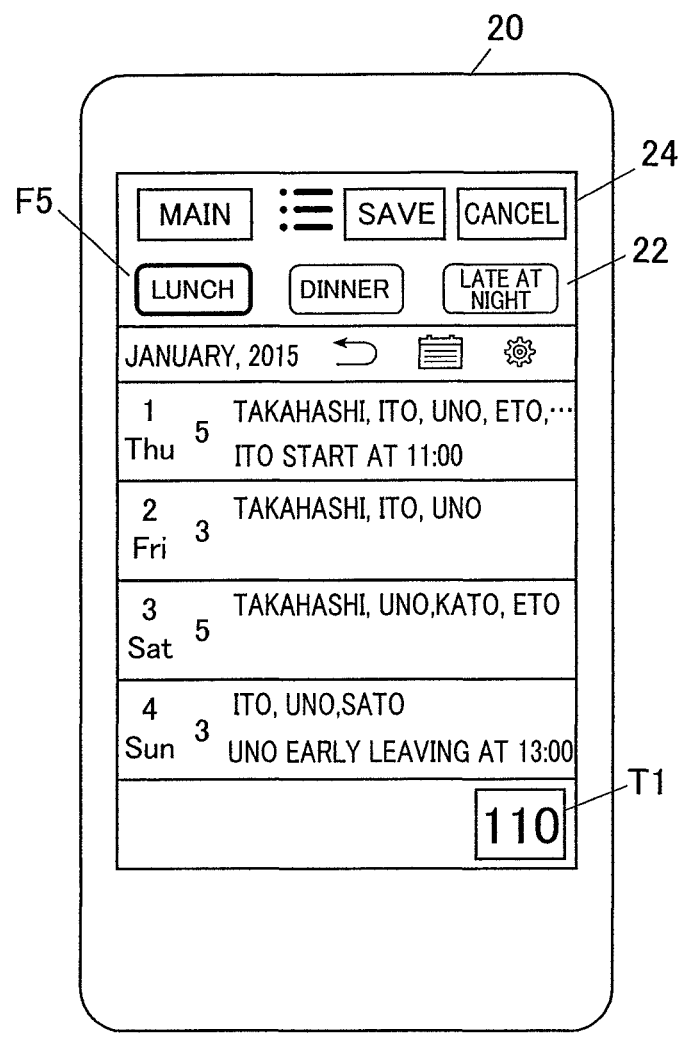
FIG. 19 is a view showing an example of screen display of the terminal device when the work shift confirmation processing is carried out.

Specifically, for example, when the CPU 21 receives the determined work shift data for a manager's review (described below) from the server 10, the CPU 21 displays on the display 24 the determined work shift F4 for a manager's review (refer to FIG. 18A) with respect to working time slot "LUNCH". In a state where the determined work shift F4 for a manager's review with respect to working time slot "LUNCH" is displayed as shown in FIG. 18A, when a touch operation is carried out on "DINNER" button 24b, the display is switched to the determined work shift F4 with respect to working time slot "DINNER" as shown in FIG. 18B. Also, in a state where the determined work shift F4 for a manager's review with respect to working time slot "DINNER" is displayed as shown in FIG. 18B, when a touch operation is carried out on "LATE AT NIGHT" button 24c, the display is switched to the determined work shift F4 with respect to "LATE AT NIGHT" as shown in FIG. 18C. That is, as shown in FIGS. 18A, 18B and 18C, similarly to the determined work input form F2, the determined work shift F4 for a manager's review is dependent corresponding to each of working time slots "LUNCH", "DINNER" and "LATE AT NIGHT" in the form of monthly calendar (calendar of each month) and is configured so as to be able to display a list of the number of person assured to work (employee assured to work) for each date. The total number T1 of the displayed person assured to work (employee assured to work) is shown at lower right part of the determined work shift F4 for a manager's review. The determined work shift F4 for a manager's review may be configured to display detailed work shift 5 in a switchable manner from which a manager can understand who is going to work on each date, for example, as shown in FIG. 19.

Figure 20A:
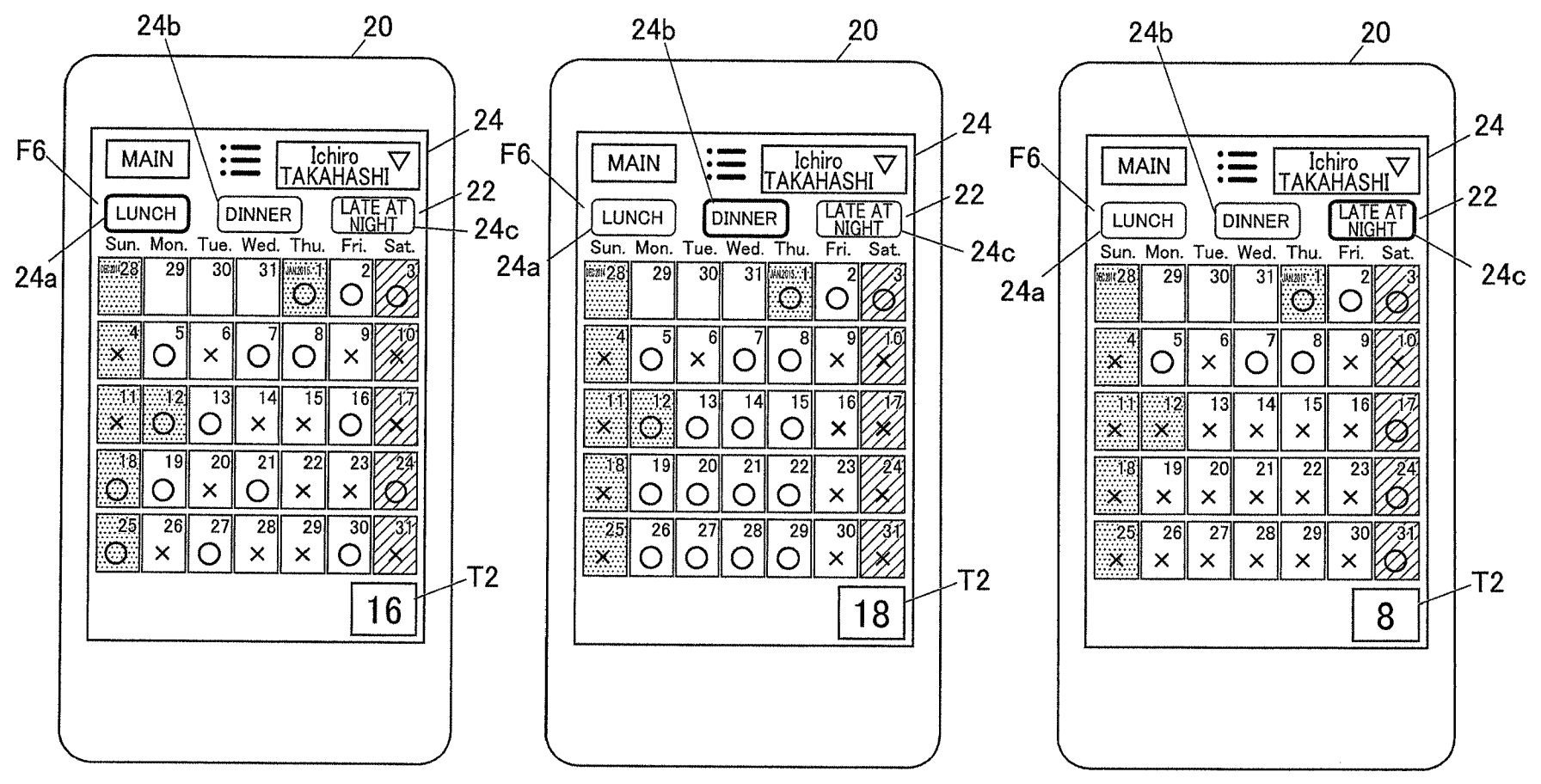
Figures 21A, 21B, 21C:
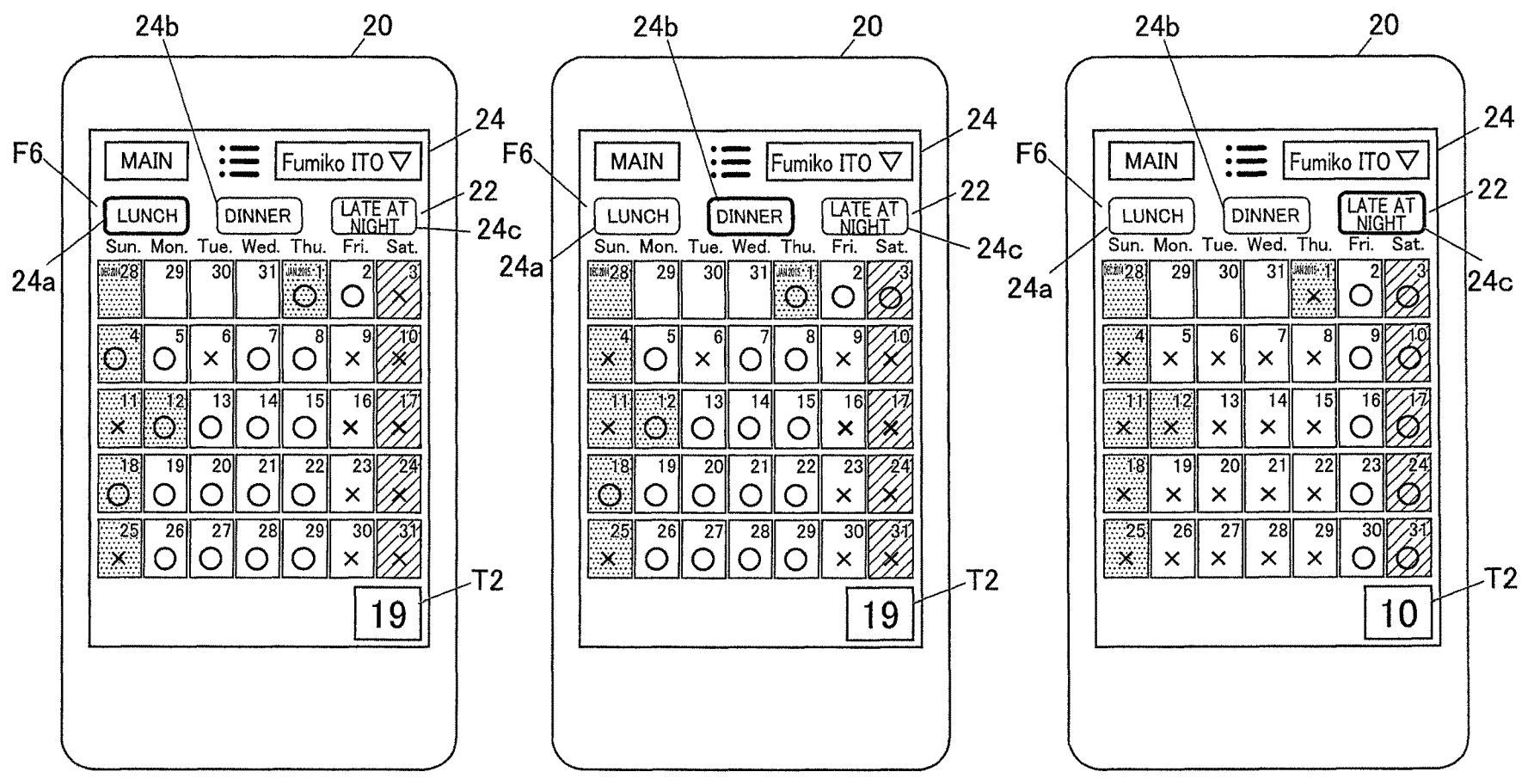

When the CPU 21 receives determined work shift data for an employee (described below) from the server 10, the CPU 21 displays on the display 24 the determined work shift F6 for an employee (refer to FIGS. 20A and 21A). As shown in FIGS. 20A and 21A, in a state where the determined work shift F6 for an employee with respect to working time slot "LUNCH" is displayed, when a touch operation is carried out on "DINNER" button 24b, for example, the display is switched to the determined work shift F6 with respect to working time slot "DINNER" as shown in FIGS. 20B and 21B. Also, as shown in FIGS. 20B and 21B, in a state where the determined work shift F6 for an employee with respect to working time slot "DINNER" is displayed, when a touch operation is carried out on "LATE AT NIGHT" button 24c, for example, the display is switched to the determined work shift F6 with respect to working time slot "LATE AT NIGHT" as shown in FIGS. 20C and 21C.

FIGS. 20A, 20B and 20C each show an example of the determined work shift F6 of an employee "Ichiro TAKAHASHI" for each working time slot. FIGS. 21A, 21B and 21C each show an example of the determined work shift F6 of an employee "Fumiko ITO" for each working time slot. AS shown in FIGS. 20A, 20B, 20C, 21A, 21B and 21C, the determined work shift F6 for an employee is dependent corresponding to each of working time slots "LUNCH", "DINNER" and "LATE AT NIGHT" in the form of monthly calendar (calendar of each month) and is configured so as to display a list of the working day and the not working day for each working time slot. The total of displayed working days T2 is displayed at the lower right part of the determined work shift F6 for an employee.

Figure 17B:
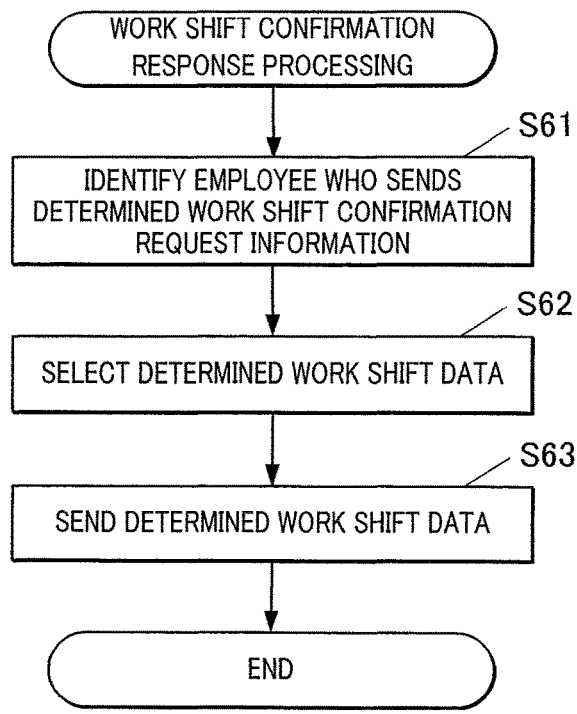
FIG. 17B is a flowchart showing work shift confirmation response processing.

With reference to FIG. 17B, the work shift confirmation response processing carried out in the server 10 will be described. The work shift confirmation response processing is processing to send the determined work shift data to the terminal device 20.

When the server 10 receives, via the communication unit 16, the determined work shift confirmation request information sent from the terminal device 20 corresponding to Step S51 in FIG. 17A as a trigger, the CPU 11 carries out the work shift confirmation response processing in cooperation with the work shift confirmation response program 153 read from the storage 15 and deployed in the RAM 13 in an appropriate manner.

First, the CPU 11 identifies an employee from information describing an employee No included in the determined work shift confirmation request information sent from the terminal device 20 (Step S61). Then, the CPU 11 selects the determined work shift data corresponding to the employee identified in Step S61 (Step S62). Specifically, when the employee specified in Step S61 is "Tato TANAKA" with the employee No. 1234, since "Taro TANAKA" has a "ROLE" of management, the CPU 11 selects the determined work shift data for a manager's review. Also, when the employee specified in Step S61 is "Saburo SUZUKI" with an employee No. 1236, since "ROLE" of "Saburo Suzuki" is work in a hall but not management, the CPU 11 selects the determined work shift data for an employee.

The CPU 11 sends, via the communication unit 16, the determined work shift data selected in Step S62 to the terminal device 20 (Step S61) and ends the work shift confirmation response processing.

As described above, the server 10 makes the input form for designating a desired working time slot among a plurality of working time slots (working day input form F1) be displayed for each user ID, and counts the number of people who can work in a working time slots for each of the working time slots. The input form is a separate form for each of the working time slots. The input form has plural fields corresponding to dates in a predetermined manner, and has a mark attachment area for attaching a predetermined mark provided at each of the fields corresponding to dates. The server 10 counts the number of people who can work in each of the working time slots for each of the fields corresponding to dates by counting the number of user IDs attached to the mark attachment area.

Thus, according to the present embodiment, the input form (working day input form F1) is configured to be a separate form for each of the working time slots, plural fields corresponding to dates are provided in a predetermined manner, and a mark attachment area is provided for attaching a predetermined mark for each of fields corresponding to dates. It is possible to make the input form simpler and to make inputting to the input form simpler. Since it is possible to easily count the number of people who can work in each of working time slots in association with each of the fields corresponding to dates, generating the work shift for each of working time slot is made easier.

The server 10 makes a determined work shift table (determined work shift F6 for an employee) be displayed for each of the user IDs. The work shift table is separate for each of the working time slots, and plural fields corresponding to dates are provided in a predetermined manner. A predetermined mark is configured to be displayed in each of the fields corresponding to dates. Thus, it is possible to make the work shift table simpler and to make the work shift table easy viewable.

The server 10 makes a detailed table (counting result screen F3) which describes the employees counted when the number of employees who can work is counted be displayed and designates the person assured to work among the employees displayed on the detailed table. Thus, since the employee assured to work can be determined when the number of people who can work is confirmed for each of the working time slot on each date, generating the work shift table becomes easier.

The server 10 makes a counting table of determined number of people describing the number of people assured to work (determined work shift F4) be displayed. The counting table of determined number of people is separate for each of working time slots and includes plural field associated with dates in a predetermined manner. When a person assured to work is designated among the employees described on the detailed table described above, the number of persons assured to work is displayed by the server 10 in the field associated with a date on which the persons assured to work will work, it is possible to increase the efficiency in generating the assured number of people counting table.

In the description above, the storage 15 such as an HDD and an SSD is described as a computer-readable recording medium according to the present invention. However, this is not limitative. A portable recording medium such as a flash memory and a CD-ROM can be applied as another computer-readable recording medium. A carrier wave may be applied to the present invention as medium which provides program data via a communication line.

The description above of the present embodiment is an example of a work shift management device, a work shift management method and a computer-readable recording medium. However, this is not limitative.

For example, in the embodiment described above, the terminal device 20 carries out the work shift submission processing, the work shift generation processing and the work shift confirmation processing. However, this is not limitative. For example, the server 10 may be configured so as to carry out processing similar to the work shift submission processing, the work shift generation processing and the work shift confirmation processing. That is, the server 10 may carry out the operation of the work shift management system 1 described above by itself.

Figure 22A:
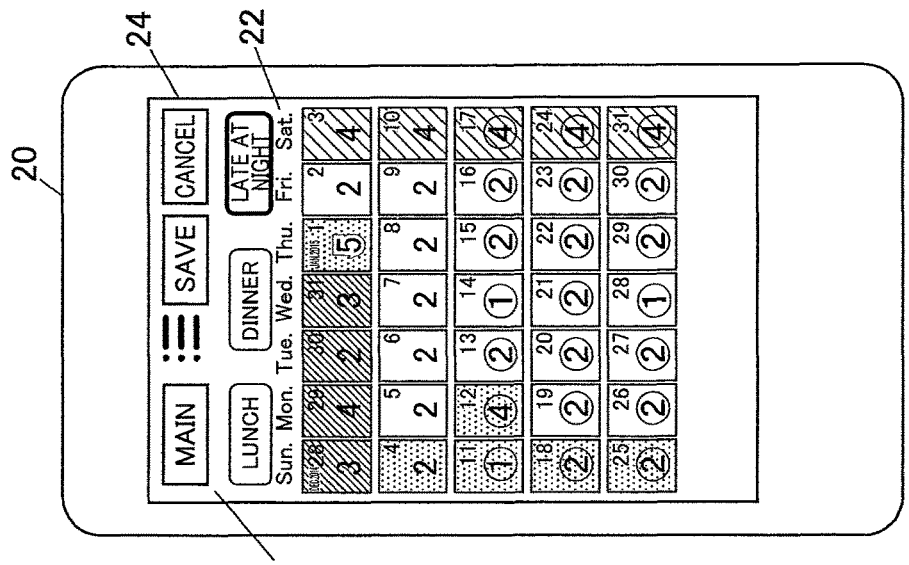
FIG. 22A is a view showing another example of the determined work input form of each working time slot.
Figure 22B:
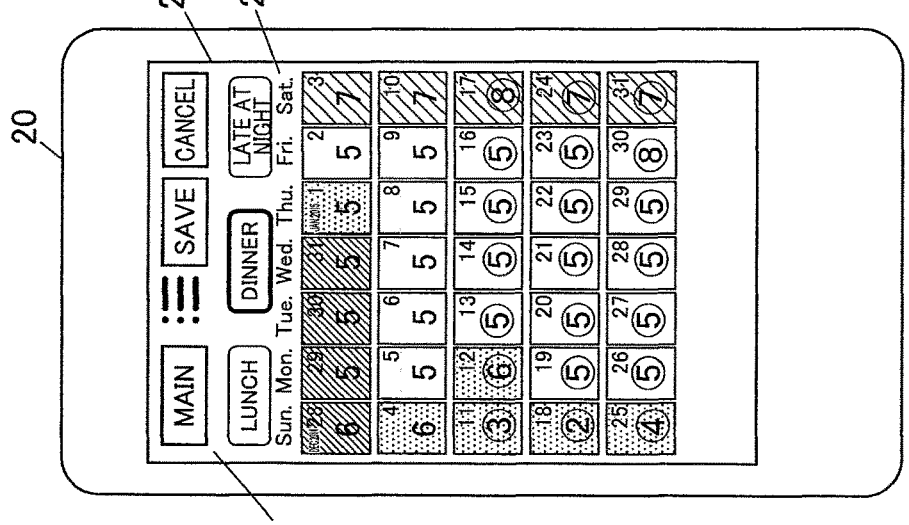
FIG. 22B is a view showing another example of the determined work input form of each working time slot.
Figure 22C:
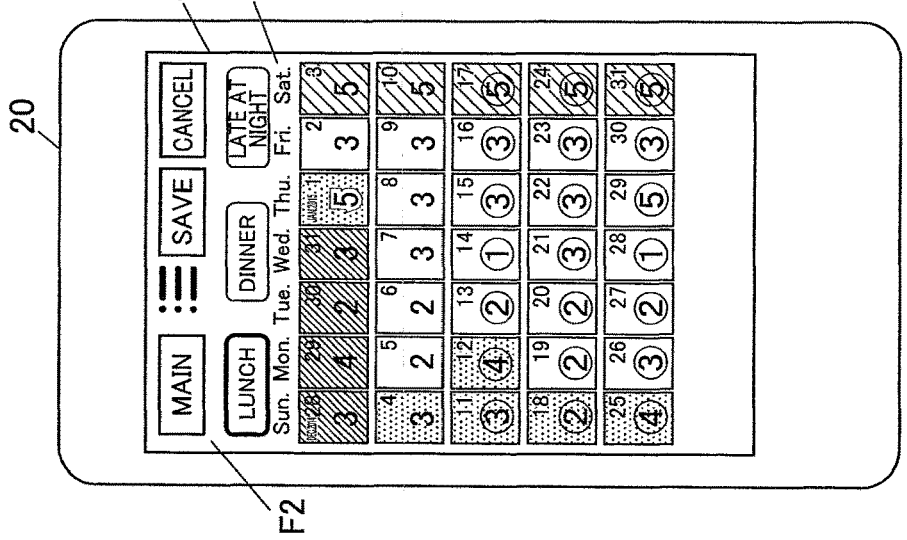
FIG. 22C is a view showing another example of the determined work input form of each working time slot.

In the embodiment described above, when the determined work input form F2 is displayed on the display 24 in Step S33 of the work shift generation processing, blank state is displayed in the field associated with a date on which the number of persons assured to work (employee assured to work) is not determined. However, this displaying aspect is a mere example. For example, in the field associated with a date on which the number of persons assured to work is not determined, as shown in FIGS. 22A, 22B and 22C, the number of employees who desires to work on a date associated with the field and which is counted by the server 10 may be displayed in a manner different from a displaying manner of the number of employees assured to work (for example, by encircled numbers). In this case, the determined work input form F2 is displayed by the server 10 (fifth display controller) as a counting table which describes the number of employees who desires to work and which is counted by the server 10 (counting table of the number of persons possible to work).

In the embodiment described above, by carrying out a touch operation on a field associated with a date which is a blank field on the working day input form F1, displaying is carried out in which a desired mark is attached to each field associated with the date. However, for example, when the working day input form F1 is displayed for the first time, displaying may be carried out in which a predetermined mark (for example, "○" mark) is attached to each field associated with a date, and an employee may attach a predetermined mark only on a date when he/she wishes to change the mark. Owing to this, an employee does not need to carry out a touch operation on all of the displayed fields associated with dates, and thus, it is possible to reduce burden.

In the embodiment described above, the working day input form F1, the determined work input form F2, the determined work shift F4 for a manager's review and the determined work shift F6 for an employee are each in the form of a monthly calendar (calendar of each month). However, they may have any form in which the information of a year, a month and a day or the information of time are expressed by fields associated with time corresponding to a predetermined time slot.

It is needless to say that the detailed configuration and detailed operation of the work shift management system 1 in the embodiment described above may be changed appropriately without departing from the spirit of the present invention.

Embodiments of the present invention have been described, but the scope of the present invention is not limited to the embodiments described above, but includes the scope of the invention described in claims and equivalents thereof.

The invention claimed is:

1. A work shift management device comprising:
a touch panel display; and
a hardware processor which is configured to:
display, on the touch panel display, for each of a plurality of user IDs, an input form screen for designating a desired working time slot among a plurality of working time slots; and
count a number of people who can work in each of the working time slots,
wherein the hardware processor is further configured to:
display, in the input form screen, a plurality of working time slot buttons corresponding respectively to the plurality of working time slots,
detect, via the touch panel display, a touch operation by a user on one of the displayed working time slot buttons to select said one of the displayed working time slot buttons;
display, in the input form screen, an input form for the working time slot corresponding to the selected one of the plurality of working time slot buttons, wherein the hardware processor displays a separate input form for each of the plurality of working time slots in accordance with the selected working time slot button, such that when another one of the working time slot buttons is selected, the hardware processor switches the displayed input form to the input form corresponding to the selected another one of the working time slot buttons,
display, in each separate input form, a plurality of date fields that have a predetermined form and that are respectively associated with dates, and display a mark attachment area for attaching a predetermined mark at each date field,
display the predetermined mark in the mark attachment area of any one of the date fields specified by a user according to a mark attachment operation, and
count the number of people who can work in each of the time slots associated with each of the date fields by counting a number of the user IDs for which the mark is attached to the mark attachment area, and display a result of the counting.

2. The work shift management device according to claim 1, wherein the hardware processor is further configured to:
display a determined work shift table for each of the user IDs, wherein the hardware processor displays a separate work shift table for each of the plurality of working time slots,
display, in each separate work shift table, the plurality of date fields having a predetermined form, and
display, in each separate work shift table, a predetermined mark indicating that a work shift is determined in each of the date fields for which the work shift has been determined.

3. The work shift management device according to claim 1, wherein the hardware processor is further configured to:
display a detailed table describing employees who are counted when the number of people who can work are counted for each of the working time slots of each date; and
designate a person assured to work among the employees displayed on the detailed table.

4. The work shift management device according to claim 3, wherein the hardware processor is further configured to:
display a counting table of determined number of people describing a number of the employees assured to work, wherein the hardware processor displays a separate counting table of determined number of people for each of the plurality of working time slots,
display, in each separate counting table of determined number of people, the plurality of date fields having a predetermined form, and
when the person assured to work is designated, display, in each separate counting table of determined number of people, a number of the person or the persons assured to work in the date field in which the person or persons assured to work is designated.

5. The work shift management device according to claim 4, wherein the hardware processor is further configured to:
display a counting table of a number of people who can work describing the counted number of people who can work, wherein the hardware processor displays a separate counting table of a number of people who can work for each of the plurality of working time slots,
display, in each separate counting table of a number of people who can work, the plurality of date fields having a predetermined form, and
display, in each separate counting table of a number of people who can work, the number of people who can work in each of the date fields.

6. The work shift management device according to claim 5, wherein the hardware processor displays the number of people who can work and the number of people assured to work in manners different from each other.

7. The work shift management device according to claim 6, wherein the hardware processor displays the number of people who can work as a number which is not encircled and the number of people assured to work as a number which is encircled.

8. A work shift management method comprising:
displaying, on a touch panel display, for each of a plurality of user IDs, an input form screen for designating a desired working time slot among a plurality of working time slots; and
counting a number of people who can work in each of the working time slots,
wherein the work shift management method further comprises:
displaying, in the input form screen, a plurality of working time slot buttons corresponding respectively to the plurality of working time slots,
detecting, via the touch panel display, a touch operation by a user on one of the displayed working time slot buttons to select said one of the displayed working time slot buttons;
displaying, in the input form screen, an input form for the working time slot corresponding to the selected one of the plurality of working time slot buttons, wherein a separate input form is displayed for each of the plurality of working time slots in accordance with the selected working time slot button, such that when another one of the working time slot buttons is selected, the displayed input form is switched to the input form corresponding to the selected another one of the working time slot buttons, displaying, in each separate input form, a plurality of date fields that have a predetermined form and that are respectively associated with dates, and displaying a mark attachment area for attaching a predetermined mark at each date field, displaying the predetermined mark in the mark attachment area of any one of the date fields specified by a user according to a mark attachment operation, and counting the number of people who can work in each of the time slots associated with each of the date fields by counting a number of the user IDs for which the mark is attached to the mark attachment area, and displaying a result of the counting.

9. The work shift management method according to claim 8, further comprising:

displaying a determined work shift table for each of the user IDs, wherein a separate work shift table is displayed for each of the plurality of working time slots, displaying, in each separate work shift table, the plurality of date fields having a predetermined form, and displaying, in each separate work shift table, a predetermined mark indicating that a work shift is determined in each of the date fields for which the work shift has been determined.

10. The work shift management method according to claim 8, further comprising:

displaying a detailed table describing employees who are counted when the number of people who can work are counted for each of the working time slots of each date; and designating a person assured to work among the employees displayed on the detailed table.

11. The work shift management method according to claim 10, further comprising:

displaying a counting table of determined number of people describing a number of the employees assured to work, wherein a separate counting table of determined number of people is displayed for each of the plurality of working time slots, displaying, in each separate counting table of determined number of people, the plurality of date fields having a predetermined form, and when the person assured to work is designated, displaying a number of the person or persons assured to work in the date field in which the person or persons assured to work is designated.

12. The work shift management method according to claim 11, further comprising:

displaying a counting table of a number of people who can work describing the counted number of people who can work, wherein a separate counting table of a number of people who can work is displayed for each of the plurality of working time slots, displaying, in each separate counting table of a number of people who can work, the plurality of date fields having a predetermined form, and displaying, in each separate counting table of a number of people who can work, the number of people who can work in each of the date fields.

13. The work shift management method according to claim 12, wherein the number of people who can work and the number of people assured to work are displayed in manners different from each other.

14. The work shift management method according to claim 13, wherein the number of people who can work is displayed as a number which is not encircled and the number of people assured to work is displayed as a number which is encircled.

15. A non-transitory computer-readable recording medium storing a program thereon that is executable by a computer of a work shift management device to cause the computer to perform processes comprising:

displaying, on a touch panel display, for each of a plurality of user IDs, an input form screen for designating a desired working time slot among a plurality of working time slots; and counting a number of people who can work in each of the working time slots, wherein the program causes the computer to perform further processes comprising:

displaying, in the input form screen, a plurality of working time slot buttons corresponding respectively to the plurality of working time slots, detecting, via the touch panel display, a touch operation by a user on one of the displayed working time slot buttons to select said one of the displayed working time slot buttons;

displaying, in the input form screen, an input form for the working time slot corresponding to a selected one of the plurality of working time slot buttons, wherein a separate input form is displayed for each of the plurality of working time slots in accordance with the selected working time slot button, such that when another one of the working time slot buttons is selected, the displayed input form is switched to the input form corresponding to the selected another one of the working time slot buttons, displaying, in each separate input form, a plurality of date fields that have a predetermined form and that are respectively associated with dates, and displaying a mark attachment area for attaching a predetermined mark at each date field, displaying the predetermined mark in the mark attachment area of any one of the date fields specified by a user according to a mark attachment operation, and counting the number of people who can work in each of the time slots associated with each of the date fields by counting a number of the user IDs for which the mark is attached to the mark attachment area, and displaying a result of the counting.

16. The computer-readable recording medium according to claim 15, wherein the program causes the computer to perform further processes comprising:

displaying a determined work shift table for each of the user IDs, wherein a separate work shift table is displayed for each of the plurality of working time slots, displaying, in each separate work shift table, the plurality of date fields having a predetermined form, and displaying, in each separate work shift table, a predetermined mark indicating that a work shift is determined in each of the date fields for which the work shift has been determined.

17. The computer-readable recording medium according to claim 15, wherein the program causes the computer to perform further processes comprising:

displaying a detailed table describing employees who are counted when the number of people who can work are counted for each of the working time slots of each date; and designating a person assured to work among the employees displayed on the detailed table.

18. The computer-readable recording medium according to claim 17, wherein the program causes the computer to perform further processes comprising:

displaying a counting table of determined number of people describing a number of the employees assured to work, wherein a separate counting table of determined number of people is displayed for each of the plurality of working time slots, displaying, in each separate counting table of determined number of people, the plurality of date fields having a predetermined form, and when the person assured to work is designated, displaying a number of the person or persons assured to work in the date field in which the person or persons assured to work is designated.

19. The computer-readable recording medium according to claim 18, wherein the program causes the computer to perform further processes comprising:

displaying a counting table of a number of people who can work describing the counted number of people who can work, wherein a separate counting table of a number of people who can work is displayed for each of the plurality of working time slots, displaying, in each separate counting table of a number of people who can work, the plurality of date fields having a predetermined form, and displaying, in each separate counting table of a number of people who can work, the number of people who can in each of the date fields.

20. The computer-readable recording medium according to claim 19, wherein the number of people who can work and the number of people assured to work are displayed in manners different from each other.

\* \* \* \* \*